United States Patent
Jang et al.

(10) Patent No.: US 11,016,724 B2
(45) Date of Patent: May 25, 2021

(54) METHOD FOR CHANGING AUDIO SIGNAL PATH ACCORDING TO EXTERNAL ELECTRONIC DEVICE TRANSMITTING EM SIGNAL AND ELECTRONIC DEVICE THEREFOR

(71) Applicant: Samsung Electronics Co., Ltd., Gyeonggi-do (KR)

(72) Inventors: Seokkyu Jang, Gyeonggi-do (KR); Keonpyo Kong, Gyeoriggi-do (KR); Kiyun Kim, Gyeonggi-do (KR); Hwangki Min, Gyeonggi-do (KR); Kiheung Park, Gyeonggi-do (KR); Byungsung Kang, Gyeonggi-do (KR); Moohyun Shin, Gyeonggi-do (KR); Jeonghyeon Yun, Gyeonggi-do (KR); Dongsun Lim, Gyeonggi-do (KR); Doosuk Kang, Gyeonggi-do (KR); Seungnyun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/713,873

(22) Filed: Dec. 13, 2019

(65) Prior Publication Data
US 2020/0192627 A1      Jun. 18, 2020

(30) Foreign Application Priority Data
Dec. 17, 2018   (KR) ........................ 10-2018-0162839

(51) Int. Cl.
*G06F 3/16*      (2006.01)
*H04R 3/00*      (2006.01)
(Continued)

(52) U.S. Cl.
CPC ............ *G06F 3/165* (2013.01); *G06F 3/0481* (2013.01); *G06F 3/0484* (2013.01); *H04R 3/00* (2013.01);
(Continued)

(58) Field of Classification Search
USPC .............. 381/2, 56, 58, 80, 81, 85, 123, 150
See application file for complete search history.

(56) References Cited

U.S. PATENT DOCUMENTS 8,320,832 B2   11/2012  Kang et al.
8,417,292 B2    4/2013  Kim et al.
(Continued)

FOREIGN PATENT DOCUMENTS

KR    2009-0094603    9/2009

OTHER PUBLICATIONS

International Search Report dated Apr. 14, 2020 issued in counterpart application No. PCT/KR2019/017563, 3 pages.

*Primary Examiner* — Yosef K L
(74) *Attorney, Agent, or Firm* — The Farrell Law Firm, P.C.

(57) ABSTRACT

An electronic device and method for changing a path of an audio signal by the electronic device are provided. The method includes obtaining an electromagnetic signal (EM) signal of an external electronic device through EM sensing circuitry, identifying the external electronic device based on the obtained EM signal, changing the path of the audio signal that is output by the electronic device to be output through the external electronic device, when the identified external electronic device is capable of inputting or outputting the audio signal and is connected with the electronic device, and displaying, on a touchscreen display of the electronic device, a screen for establishing a communication connection with the external electronic device, when the (Continued)

identified external electronic device is capable of inputting or outputting the audio signal and is not connected with the electronic device.

21 Claims, 18 Drawing Sheets

(51) Int. Cl.
*G06F 3/0484* (2013.01)
*G06F 3/0481* (2013.01)
*H04R 29/00* (2006.01)

(52) U.S. Cl.
CPC ....... *H04R 29/001* (2013.01); *H04R 2420/05* (2013.01)

(56) References Cited

U.S. PATENT DOCUMENTS

| | | | |
|---|---|---|---|
| 9,135,429 B2 | 9/2015 | Moosavi et al. | |
| 9,223,732 B2 | 12/2015 | Lee et al. | |
| 9,529,755 B2 | 12/2016 | Lee et al. | |
| 9,569,055 B2 | 2/2017 | Post et al. | |
| 9,881,273 B2 | 1/2018 | Yang et al. | |
| 9,930,438 B2 | 3/2018 | Lee et al. | |
| 10,042,446 B2 | 8/2018 | Yoon et al. | |
| 10,042,504 B2 | 8/2018 | Post et al. | |
| 10,073,578 B2 | 9/2018 | Bau et al. | |
| 10,101,869 B2 | 10/2018 | Bau et al. | |
| 10,108,305 B2 | 10/2018 | Post et al. | |
| 10,141,929 B2 | 11/2018 | Rakova et al. | |
| 10,318,090 B2 | 6/2019 | Post et al. | |
| 2008/0311955 A1 | 12/2008 | Kim et al. | |
| 2012/0167232 A1 | 6/2012 | Moosavi et al. | |
| 2014/0351458 A1 | 11/2014 | Lee et al. | |
| 2014/0373123 A1* | 12/2014 | Kang | G06F 21/10 726/7 |
| 2016/0048472 A1 | 2/2016 | Lee et al. | |
| 2016/0112792 A1 | 4/2016 | Lee et al. | |
| 2016/0259432 A1 | 9/2016 | Bau et al. | |
| 2016/0261268 A1 | 9/2016 | Rakova et al. | |
| 2017/0124816 A1* | 5/2017 | Yang | H04M 1/72569 |
| 2017/0270198 A1 | 9/2017 | Sample et al. | |
| 2018/0285061 A1 | 10/2018 | Park et al. | |
| 2019/0004636 A1 | 1/2019 | Bau et al. | |

* cited by examiner

METHOD FOR CHANGING AUDIO SIGNAL PATH ACCORDING TO EXTERNAL ELECTRONIC DEVICE TRANSMITTING EM SIGNAL AND ELECTRONIC DEVICE THEREFOR

CROSS-REFERENCE TO RELATED APPLICATION(S)

This application is based on and claims priority under 35 U.S.C. § 119 to Korean Patent Application No. 10-2018-0162839, filed on Dec. 17, 2018, in the Korean Intellectual Property Office, the entire disclosure of which is incorporated by reference.

BACKGROUND

1. Field

The disclosure relates generally to a an electronic device and method for detecting an electromagnetic (EM) signal of an external electronic device and changing an audio signal path according to the external electronic device.

2. Description of Related Art

Electronic devices may radiate inherent EM signals. For example, components included in the electronic devices may radiate inherent EM signals. When an EM signal radiated from an electronic device is used, the electronic device may be identified. For example, products belonging to the same product group manufactured by the same manufacturer may be classified depending on models by using the EM signal.

Generally, a user operates an electronic device in order to establish a wireless communication connection between the electronic device and an external electronic device. For example, to connect a mobile phone with a Bluetooth headset, a user may activate Bluetooth functions of the two devices, detect a Bluetooth device by operating the mobile phone, and select the headset, which is detected through Bluetooth, by operating the mobile phone.

Conventionally, a user have to know a manner of changing the path of the audio signal and the name of an external electronic device, and to change the path of the audio signal, such that the audio signal of the mobile phone is output through the external electronic device. In addition, the user has to enter a setting menu to change the path of the audio signal and to perform an operation of changing the path of the audio signal.

SUMMARY

The disclosure is made to address at least the above-mentioned problems and/or disadvantages and to provide at least the advantages described below.

Accordingly, an aspect of the disclosure is to provide a method for changing a path of an audio signal using information on an external electronic device identified through EM signal sensing.

In accordance with an aspect of the disclosure, an electronic device is provided, is which includes a touchscreen display, wireless communication circuitry, electromagnetic signal (EM) sensing circuitry configured to sense an EM signal, a processor operatively connected with the touchscreen display, the wireless communication circuitry, and the EM sensing circuitry, and a memory configured to store a reference EM profile including information associated with an external electronic device and operatively connected with the processor. The memory is further configured to store instructions that, when executed, cause the processor to obtain an EM signal of the external electronic device through the EM sensing circuitry, identify the external electronic device, based on the obtained EM signal and the reference EM profile, change a path of an audio signal, which is currently output by the electronic device, to be output through the external electronic device, when the identified external electronic device is capable of inputting or outputting the audio signal and is connected with the electronic device, and display a screen for establishing a connection with the external electronic device, when the identified external electronic device is capable of inputting or outputting the audio signal and is not connected with the electronic device.

In accordance with another aspect of the disclosure, a method is provided for changing a path of an audio signal by an electronic device. The method includes obtaining an EM signal of an external electronic device through EM sensing circuitry, identifying the external electronic device based on the obtained EM signal, changing the path of the audio signal that is output by the electronic device to be output through the external electronic device, when the identified external electronic device is capable of inputting or outputting the audio signal and is connected with the electronic device, and displaying, on a touchscreen display of the electronic device, a screen for establishing a communication connection with the external electronic device, when the identified external electronic device is capable of inputting or outputting the audio signal and is not connected with the electronic device.

In accordance with another aspect of the disclosure, a computer-readable recording medium is provided, which store instructions that when executed by a processor of an electronic device, cause the electronic device to obtain an EM signal of an external electronic device through EM sensing circuitry, identify the external electronic device corresponding to the obtained EM signal, change a path of an audio signal that is output by the electronic device to be output through the external electronic device, when the identified external electronic device is capable of inputting or outputting the audio signal and is connected with the electronic device, and display, on a touchscreen display of the electronic device, a screen for establishing a communication connection with the external electronic device, when the identified external electronic device is capable of inputting or outputting the audio signal and is not connected with the electronic device.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, various embodiments of the disclosure may be described with reference to accompanying drawings. However, those of ordinary skill in the art will understand that the disclosure is not limited to a specific embodiment, and modifications, equivalents, and/or alternatives on the various embodiments described herein can be variously made without departing from the scope and spirit of the disclosure.

Figure 1:
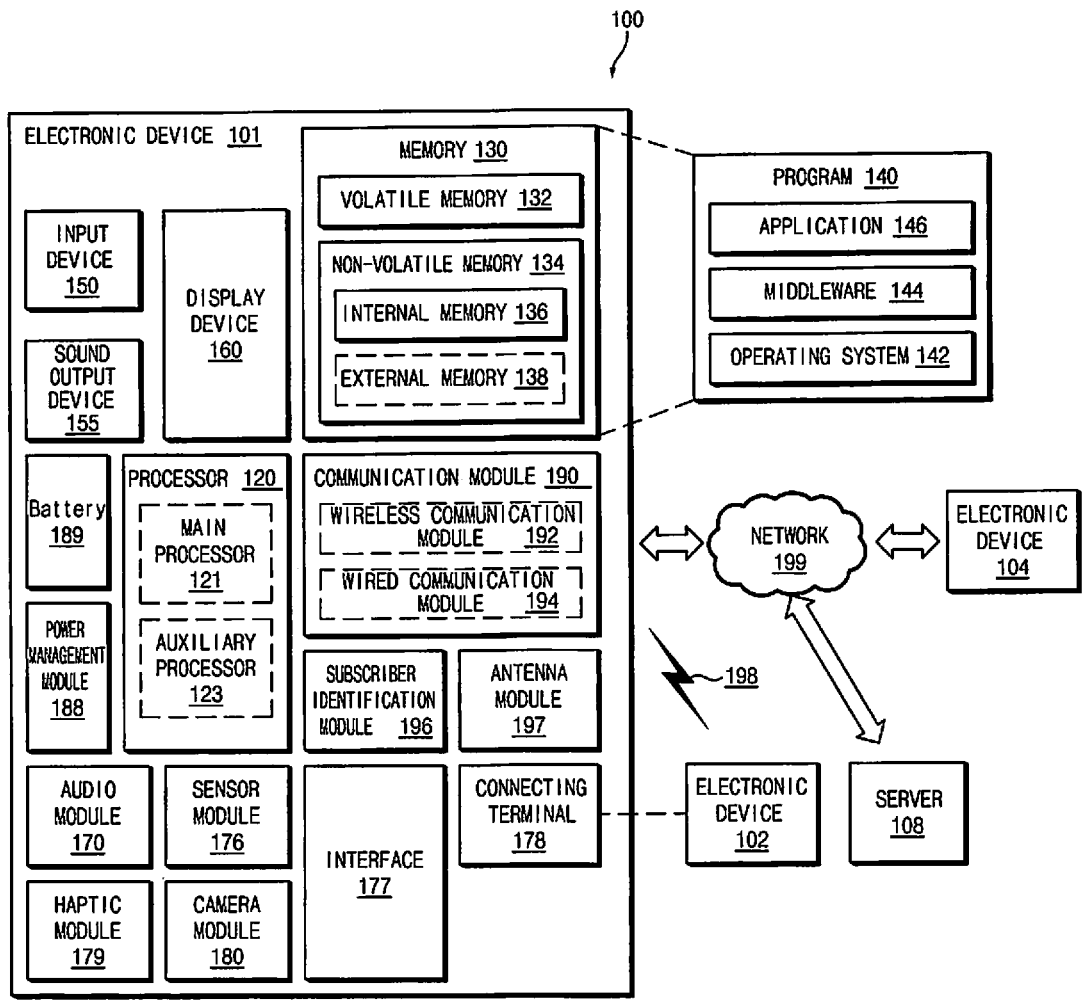
FIG. 1 illustrates an electronic device in a network environment, according to an embodiment.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data to processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
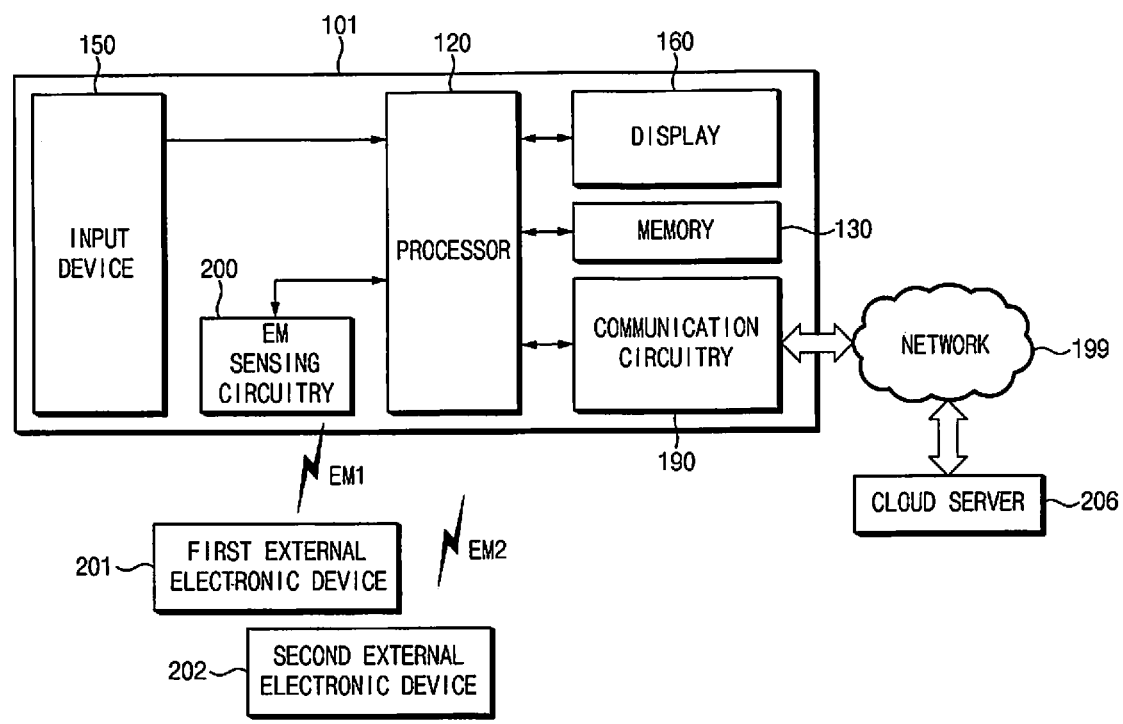
FIG. 2A illustrates an electronic device, according to an embodiment.
Figure 2B:
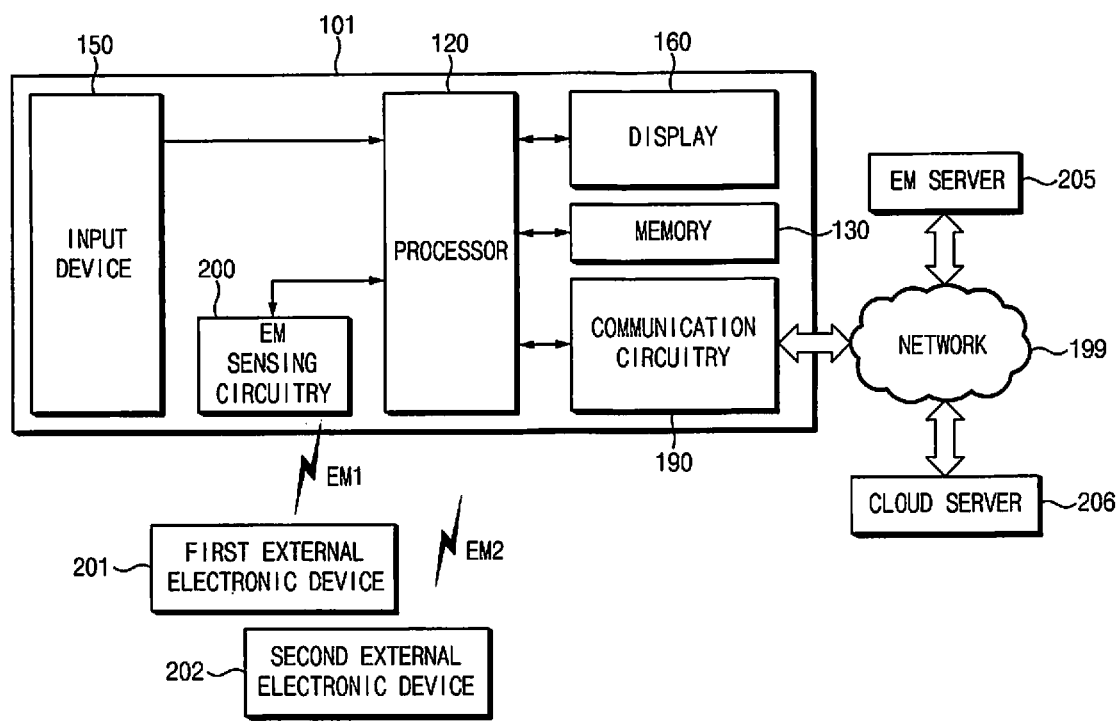
FIG. 2B illustrates an electronic device, according to an embodiment.

FIG. 2A illustrates an electronic device, according to an embodiment, and FIG. 2B illustrates an electronic device, according to another embodiment.

Referring to FIGS. 2A and 2B, an electronic device 101 includes a memory 130, an input device 150, a display 160, communication circuitry (or a communication module) 190, a processor 120, and EM sensing circuitry 200.

The memory 130 may store instructions, which when executed, cause the processor 120 to execute various operations in the disclosure, and the memory may also store a reference EM profile including information associated with an external electronic device.

The input device 150 may obtain various types of inputs from a user. The input device 150 may receive a command or data to be input to the electronic device 101, from the outside of the electronic device 101. The input of the user may include a touch input, a drag input, or a voice input.

The display 160 may display information on the input of the user, which is obtained from the input device 150, in the form of an image and/or text. For example, the display 160 may display the content of an obtained voice input in the form of text. When the electronic device 101 performs an operation corresponding to the obtained input of the user, the display 160 may display an image representing the operation performed by the electronic device 101.

The display 160 may include a touchscreen display integrally formed with a touch panel which is the input device 150.

The communication circuitry 190 may transmit information of the electronic device 101 to an EM server 205 and/or a cloud server 206 through a network 199. The communication circuitry 190 may transmit information of the electronic device 101 to the EM server 205 and/or cloud server 206.

For example, the communication circuitry 190 may transmit information on a user account of the electronic device 101 to the EM server 205 and/or cloud server 206. The communication circuitry 190 may transmit information generated from the electronic device 101 to the EM server 205 and/or cloud server 206.

When a user executes and uses a mobile game application, the communication circuitry 190 may transmit, to the EM server 205 and/or cloud server 206, information stored after the use of the mobile game application. In addition, the communication circuitry 190 may receive, from the EM server 205 and/or cloud server 206, information for implementing an operation to be executed by the electronic device 101. For example, the communication circuitry 190 may receive, from the EM server 205 and/or cloud server 206, information stored until the last executed part of the mobile game application, when the user executes the mobile game application again.

The processor 120 may be operationally connected with the display 160. The processor 120 may provide image data, such that the display 160 displays an image. The processor 120 may be operationally connected with the input device 150. The processor 120 may analyze the user input obtained from the input device 150, and may perform preparation work to implement the operation based on the content of the user input. The processor 120 may be operationally connected with the communication circuitry 190. The processor 120 may set the type of information and content transmitted and received by the communication circuitry 190.

The EM sensing circuitry 200 may receive an EM signal from at least one of external electronic devices 201 and 202.

The EM sensing circuitry 200 may sense an EM signal having a frequency band of 1 MHz or less.

The EM sensing circuitry 200 may generate first information based on an EM signal. The first information may include information on a waveform of the EM signal. The EM sensing circuitry 200 may receive a first EM signal from the first external electronic device 201 and may generate first information on a first EM signal EM1 using the amplitude and the phase of the waveform of the first EM signal EM1. The EM sensing circuitry 200 may provide the first information on the first EM signal EM1 to the processor 120. The EM sensing circuitry 200 may receive a second EM signal from the second external electronic device 202 and may generate first information on the second EM signal EM2 using the amplitude and the phase of the waveform of the second EM signal EM2. The EM sensing circuitry 200 may provide first information on the second EM signal EM2 to the processor 120

The EM sensing circuitry 200 may be operationally connected with the processor 120. The EM sensing circuitry 200 may generate first information on a plurality of EM signals EM1 and EM2 sensed under the control of the processor 120. The EM sensing circuitry 200 may transmit signals, which are sensed when the EM signals EM1 and EM2 are detected, to the processor 120, and the processor 120 may generate first information on the EM signals EM1 and EM2.

As illustrated in FIG. 2A, the electronic device 101 may store information on the external electronic devices 201 and 202 in the EM sensing circuitry 200 or the memory 130. The electronic device 101 may analyze first information based on information associated with the external electronic devices 201 and 202.

As illustrated in FIG. 2B, the electronic device 101 may transmit, to an EM server 205 having information (e.g., the types and the model names of external electronic devices) associated with external electronic devices 201 and 202, the first information generated by the EM sensing circuitry 200. The electronic device 101 may transmit the first information to the EM server 205. The EM server 205 may receive the first information. The EM server 205 may analyze the first information based on information associated with the external electronic devices 201 and 202. The EM server 205 may transmit, to the electronic device 101, the analysis result of the first information. The electronic device 101 may receive the analysis result from the EM server 205 through the communication circuitry 190.

As illustrated in FIG. 2A, the electronic device 101 may obtain information associated with the external electronic devices 201 and 202 by analyzing the first information.

As illustrated in FIG. 2B, the electronic device 101 may receive information associated with the external electronic devices 201 and 202 from the EM server 205. For example, the information associated with the external electronic devices 201 and 202 may include information on the types and the model names of the external electronic devices 201 and 202. The electronic device 101 may transmit the first information to the EM server 205, and the EM server 205 may obtain the information associated with the external electronic devices 201 and 202 by analyzing the first information. The electronic device 101 may receive the analysis result of the first information from the EM server 205. As another example, the first information may include information on the operating states of the external electronic devices 201 and 202 and information on whether the external electronic devices 201 and 202 are able to execute a command.

The EM sensing circuitry 200 may receive, from the processor 120, a control signal for controlling that the first information is transmitted to the EM server 205 through the communication circuitry 190. The processor 120 may transmit, to the EM server 205, the first information sensed by the EM sensing circuitry 200 through the communication circuitry 190.

The EM server 205 may include information on a plurality of EM signals. The EM server 205 may compare information on the EM signal included in the first information with information on the plurality of EM signals previously stored. The EM server 205 determine an external electronic device which has transmitted the EM signal included in the first information. The EM server 205 may be referred to as the first server.

The EM server 205 may generate second information on the type of the external electronic devices 201 and 202 having radiated the EM signal, by using the EM signal included in the first information. The second information may include at least one of the model name, the manufacturer, or the manufacturing date of an external electronic device. The EM server 205 may determine that the type of the external electronic device is a 65-inch television (TV) by using the EM signal included in the first information. The EM server 205 may transmit the generated second information to the electronic device 101.

The cloud server 206 may include information on a plurality of external electronic devices. The information on the plurality of external electronic devices may include the position, the model name, the manufacturer, or the manufacturing date of each external electronic device. Information on the plurality of external electronic devices may include information on access points connected with the plurality of external electronic devices.

The cloud server 206 may be a purchase server, an Internet of Things (IoT) device control server, or a payment server. The cloud server 206 and the EM server 205 may be configured to be integrated into one server.

The cloud server 206 may receive the second information and context information associated with the current situation of the electronic device 101, from the electronic device 101. The cloud server 206 may select an external electronic device, which satisfies a preset condition, of the plurality of external electronic devices, based on the second information and the context information.

The cloud server 206 may request sensing information from the plurality of external electronic devices. The cloud server 206 may select one external electronic device of the plurality of external electronic devices, based on information on the sensing signal received from the plurality of external electronic devices and the second information.

The cloud server 206 may include a database for each user account. The database may include at least a portion of position information, a request device profile, a response device profile, or operating information.

The cloud server 206 may transmit, to a request device (e.g., the electronic device 101), the position information of the database and operating information corresponding to the response device profile (the profile of the selected external electronic device).

The electronic device 101 and the plurality of external electronic devices may be registered in the cloud server 206 with the same user account. The user account of the electronic device 101 may be registered in the cloud server 206 when the user starts to use the electronic device 101. For example, when the user first starts to use the electronic device 101, the user account of the electronic device 101 may be generated from the cloud server 206 through an e-mail or a registered identification (ID) according to a preset system program, when the electronic device 101 is first started to be used. Thereafter, when the electronic device 101 is used, the user may register the first external device with the user account registered in the server 206. Alternatively, when the external electronic device is started to be used, the user may use the user account of the electronic device 101.

For example, when the electronic device 101 is used, the electronic device 101 may search for a device, such as a TV, a laptop, a light, a heating device, a refrigerator, or a smart home appliance through a short-range communication network such as a Bluetooth network or a near field communication (NFC) network and set the found device as an external electronic device. In addition, a target device set as the external electronic device, after searching, may be added to a user account. Alternatively, when the user account is set to use the external electronic device, the user account registered in the electronic device 101 may be used.

As illustrated in FIGS. 2A and/or 2B, when the cloud server 206 receives the second information from the electronic device 101, the cloud server 206 may select an external electronic device of the plurality of external electronic devices registered with the user account of the electronic device 101.

Figure 3A:
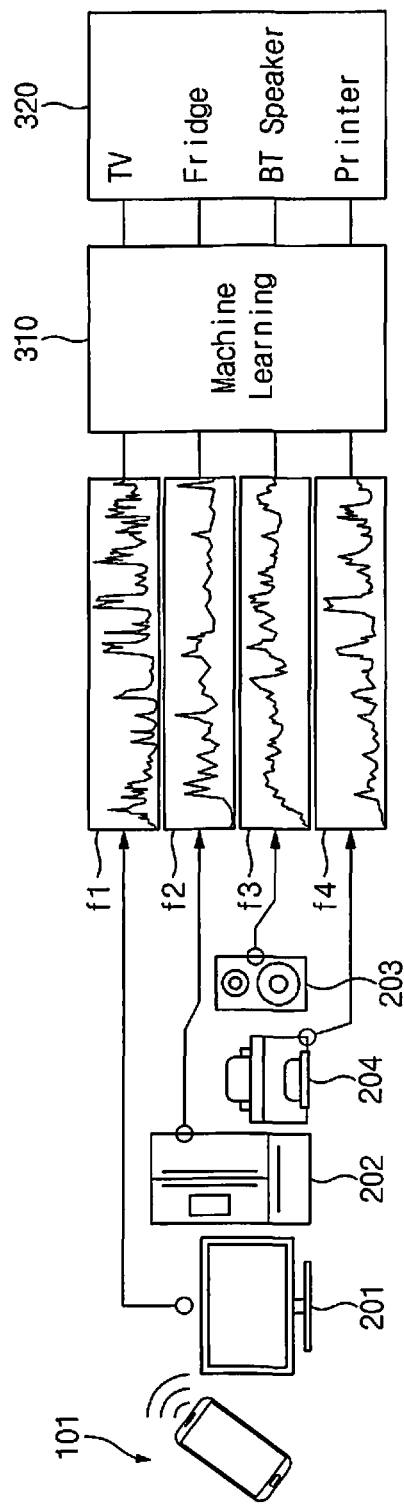
FIG. 3A illustrates an external electronic device using an EM signal, according to an embodiment.

FIG. 3A illustrates an external electronic device using an EM signal, according to an embodiment. Specifically, FIG. 3A is a schematic view illustrating that external electronic devices 201, 202, 203, and 204 are identified using the EM signal.

Figure 3B:
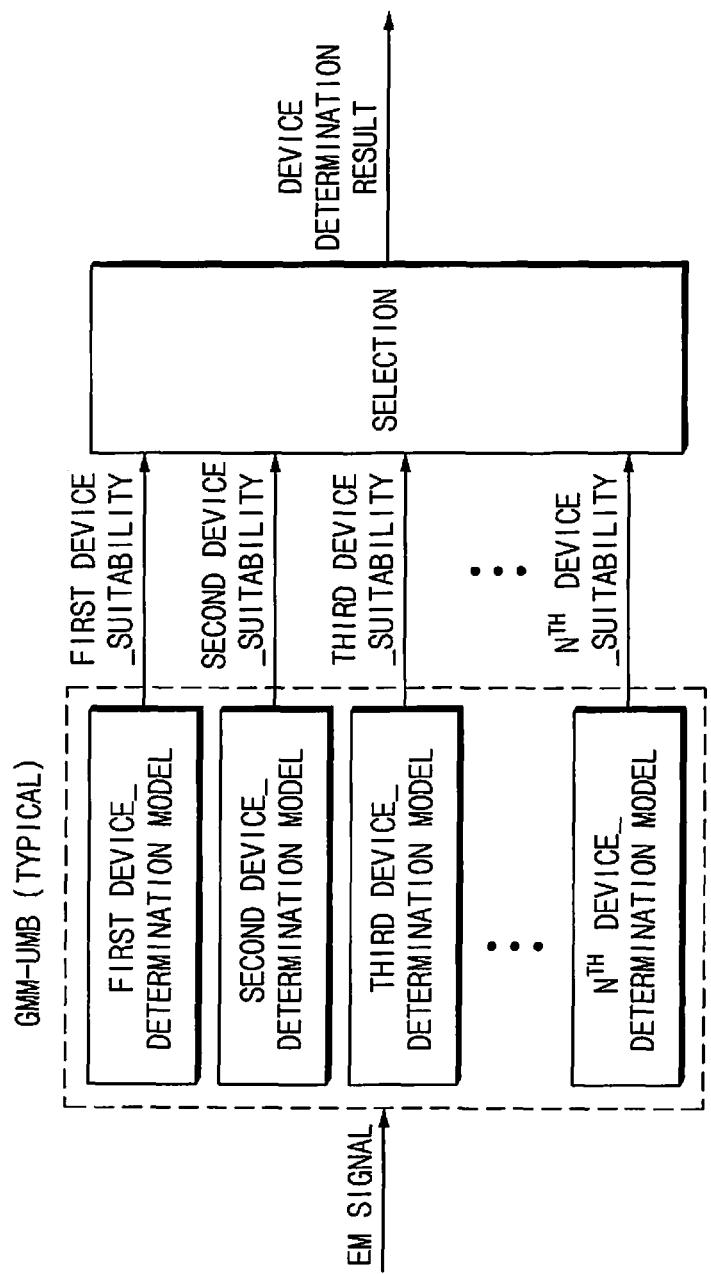
FIG. 3B illustrates machine learning, according to an embodiment.

FIG. 3B illustrates machine learning, according to an embodiment.

Referring to FIG. 3A, the external electronic devices 201, 202, 203, and 204 may be disposed around the electronic device 101. For example, a TV 201, a refrigerator 202, a Bluetooth speaker 203, and a printer 204 are disposed around the electronic device 101.

The external devices 201, 202, 203, and 204 may include various electronic components therein. The external devices 201, 202, 203, and 204 may radiate various EM signals due to the EMI caused by the their internal electronic components. The EM signals may include a plurality of inherent signals f1, f2, f3, and f4 in the set frequency range.

The electronic device 101 may obtain EM signals having a specific frequency band. For example, the electronic device 101 may obtain, through the EM sensing circuitry 200, EM signals having a specific frequency of 1 MHz or less.

When the electronic device 101 approaches any one of external electronic devices 201, 202, 203, and 204, the electronic device 101 may detect an inherent signal based on the EMI described above through a sensing module (e.g., the EM sensing circuitry 200 of FIGS. 2A and 2B) and a receive module. The electronic device 101 may transmit the first information to the EM server 205 such that the EM server 205 performs the machine learning (ML) 310. The electronic device 101 may determine an external electronic device 320 based on second information calculated through the ML 310 and may output the information of the external electronic device 320. The information on the electronic device 101 may be displayed through a display (e.g., the display 160 of FIGS. 2A and 2B) of the electronic device 101. However, the disclosure is not limited thereto, and the information on the electronic device 101 may be acoustic.

The electronic device 101 may include a memory having a waveform table including a plurality of inherent signals corresponding to the external electronic device 201, 202, 203, and 204. When the electronic device 101 includes a memory having a waveform table including the plurality of inherent signals corresponding to the external electronic device 201, 202, 203, and 204, the processor 120 of the electronic device 101 may compare an EM signal, which is obtained from an external electronic device, with the inherent signals included in the waveform table, thereby determining the external electronic device.

The electronic device 101 may obtain an EM signal generated from an external electronic device, when the electronic device 101 approaches any one of the external electronic devices 201, 202, 203, and 204, after activating the function associated with the EM sensing. The obtained EM signal may be analyzed by a classifier stored in the electronic device 101 or may be transmitted to a server (e.g., the EM server 205) performing the operation of analyzing the EM signal.

The classifier may perform an operation of determining the model name of the m external electronic device. The operation of determining the model name of the external electronic device may be performed by a separate server (e.g., the cloud server 260), and the separate server may learn the operation of determining and may transmit the learning data to the electronic device 101. The electronic device 101 may store the received learning data. In addition, the classifier may be consistently updated by improving cognition accuracy or adding a target device. The learning algorithm may include a machine learning algorithm including at least one of Deep Learning, Gaussian Mixture Model (GMM), Support Vector Machine (SVM), or Random Forest. The classifier for the EM signal may be differently implemented depending on machine learning algorithms.

When a GMM scheme is applied, the classifier may operate as illustrated in FIG. 3B. The electronic device 101 or the EM server 205 having the EM signal received therein may have determination models for a plurality of external electronic devices to which the machine learning 310 is applied. The electronic device 101 or the EM server 205 may calculate the suitability corresponding to each external electronic device by applying the EM signal to each determination model. The electronic device 101 or the EM server 205 may determine the model name of the external electronic device by using the suitability. The electronic device 101 or the EM server 205 may have a frequency table to which various determination models are applied while applying various machine learning algorithms.

As another example, the electronic device 101 or the EM server 205 may employ a deep learning determination model, such as Deep Neural Networks (DNNS) or Convolutional Neural Networks (CNNs). In this case, the suitability of the total N devices may be simultaneously calculated, which is different than the Gaussian mixture model—universal background model (GMM-UBM).

The waveform table may be stored in the EM server 205, which is able to communicate with the electronic device 101 through the network. For example, the processor 120 of the electronic device 101 may transmit the first information including an EM signal to the EM server 205. The EM server 205 may determine an external electronic device, which has generated the EM signal, by comparing the EM signal included in the first information with a plurality of inherent signals stored in the waveform table of the EM server 205. The EM server 205 may transmit information for identifying the determined external electronic device to the electronic device 101.

The electronic device 101 may execute a specific application based on ID information of a target device. When the target device is identified as a TV, the electronic device 101 may automatically execute an application associated with a remote control, which is able to control the TV, and may automatically connect the TV. The electronic device 101 becomes in a stand-by state of controlling the target device through an operation of approaching the target device, thereby increasing the user convenience.

Figure 4:
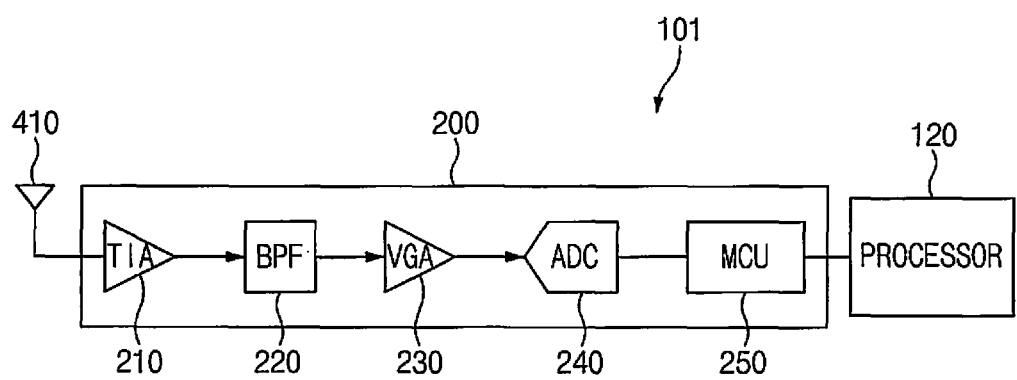
FIG. 4 illustrates components that perform EM sensing of an electronic device, according to an embodiment.

FIG. 4 illustrates components that perform EM sensing of an electronic device, according to an embodiment.

Referring to FIG. 4, the electronic device 101 includes an antenna 410 to detect EM signals radiated from a plurality of external electronic devices (e.g., the external electronic devices 201 and 202 of FIGS. 2A and 2B), an EM sensing circuitry 200 to analyze the detected EM signal, and the processor 120. The processor 120 may identify the target device using detection information received from the EM sensing circuitry 200.

The EM sensing circuitry 200 includes a trans-impedance amplifier (TIA) 210, a band pass filter (BPF) 220, a variable gain amplifier (VGA) 230, an analog-digital converter (ADC) 240, and a micro-controller unit (MCU) 250.

The antenna 410 may have a reception bandwidth capable of receiving the EM signal. The TIA 210 may amplify a frequency of 1 MHz or less, which is received from the antenna 410. The BPF 220 passes a frequency component, which defines a specific pattern, of the amplified signal, which is received from the TIA 210, and may filter out noise which is a frequency component irrelevant to the specific pattern. The BPF band pass filter 220 may pass a frequency component of 1 MHz or less in the EM signal and filter out a frequency component of more than 1 MHz. The VGA 230 may output a signal having a specific level throughout a preset gain range, thereby improving the noise characteristic and an external interference signal removal characteristic of the filtered signal. The ADC 240 may convert an analog signal provided from the VGA 230 into a digital signal to be provided to the MCU 250.

The MCU 250 may compare the EM signal converted to the digital signal with EM signals in the waveform table stored in the electronic device 101, and may identify the external electronic device. For example, the MCU 250 may compare the maximum amplitude of the EM signal and the waveform of the EM signal with those of a plurality of waveforms stored in the waveform table. The MCU 250 may provide the identified information to the processor 120 of the electronic device 101. However, the disclosure is not limited thereto.

The MCU 250 may directly provide the provided identified information to the processor 120 of the electronic device 101. In this case, the identification operation of the target device based on the waveform comparison may be performed by the processor 120 of the electronic device 101.

The electronic device 101 may minimize self-generated noise from the electronic device 101 in order to detect the optimal waveform of the input signal. As a signal generated from the electronic device 101 is applied to the EM sensing circuitry 200, the signal should be compensated. The electronic device 101 may detect internal noise caused by the touchscreen input and apply a compensation algorithm to minimize the input error, and may detect a distorted waveform based on a grip type when a plurality of antennas 410 are configured. The EM signal sensed by the electronic device 101 may be different from the EM signal generated from the target device, depending on a touch input by the user or various conditions, such as a grip state of the electronic device 101, of the electronic device 101.

The electronic device 101 may consistently collect information by comparing the measured EM signal with the inherent EMI detection information of the target device. The collected information may be utilized to correct EMI detection correction thereafter by finding the correlation to the EMI detection information through the analysis of big data. The analysis of the big data may include Regression, Clustering, or Correlation Analysis.

The processor 120 may perform a control operation such that only EM signals that satisfy a preset condition from among EM signals generated from the external electronic devices 201, 202, 203, or 204 are provided to the processor 120, which allows the EM sensing circuitry 200 to selectively detect an EM signal.

Figure 5:
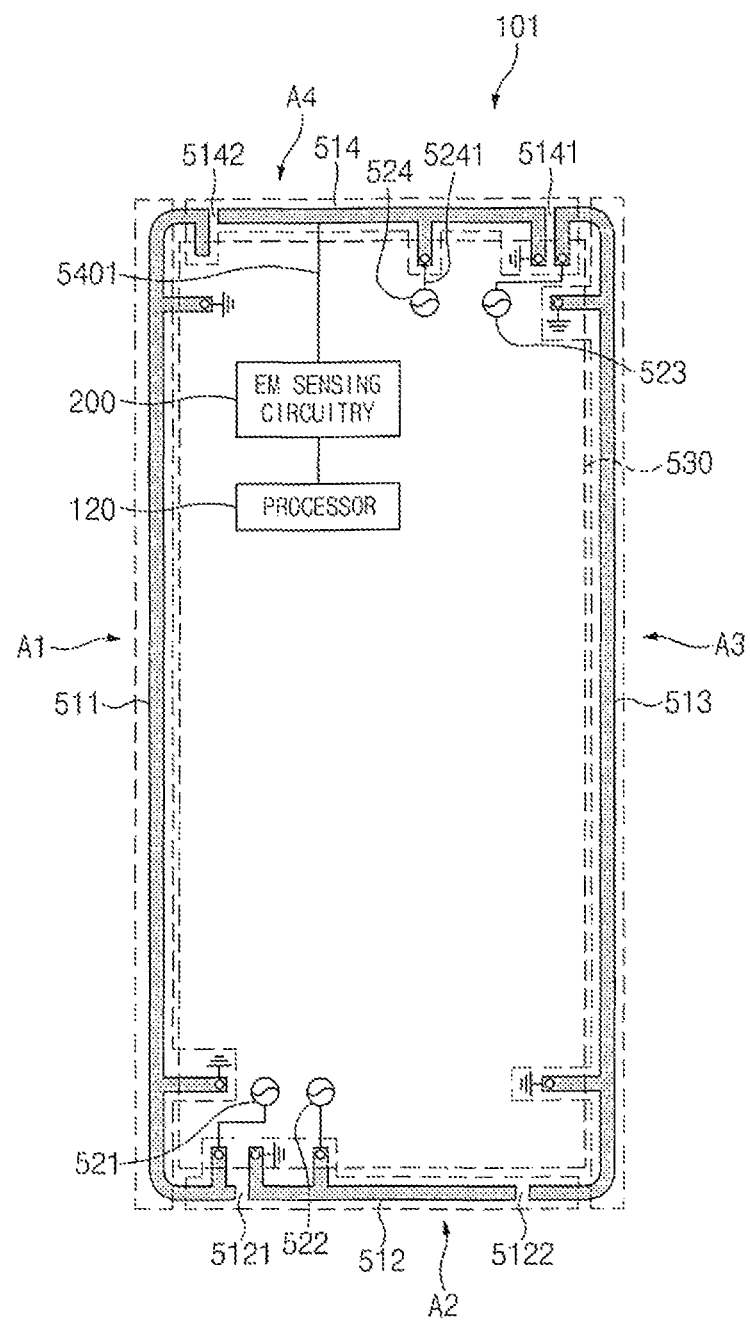
FIG. 5 illustrates an antenna of an electronic device, according to an embodiment.

FIG. 5 illustrates an antenna of an electronic device, according to an embodiment. The antenna may be disposed corresponding to the edge of the electronic device 101, such that the electronic device 101 senses the EM signal without distortion. The electronic device 101 may utilize, as the antenna, at least a portion of a housing defining an outer portion of the electronic device 101 to improve the sensing efficiency of the EM signal.

Referring to FIG. 5, at least a portion of the electronic device 101 utilized as the antenna of the electronic device (e.g., the electronic device 101 of FIGS. 2A and 2B) may include a conductive member. The housing may be formed through a double injection manner of a conductive member and a non-conductive member. The at least a portion of the housing may be disposed to be exposed along the edge of the electronic device 101.

The housing including the metal member includes a first side surface 511 having a first length, a second side surface 512 having a second length and extending in a direction perpendicular to the first side surface 511, a third side surface 513 extending from the second side surface 512 with the first length in parallel to the first side surface 511, and a fourth side surface 514 extending with the second length from the third side surface 513 in parallel to the second side surface 512. The first side surface 511, the second side surface 512, the third side surface 513, and the fourth side surface 514 may be formed integrally with each other. The first length may be formed to be longer than the second length.

The second side surface 512 may include unit conductive parts electrically isolated from each other by a pair of non-conductive parts 5121 and 5122 spaced apart from each other by a specific distance. In addition, the fourth side surface 514 may include unit conductive parts electrically isolated from each other by a pair of non-conductive parts 5141 and 5142 spaced apart from each other by a specific distance.

At least one of the plurality of conductive parts, which are electrically isolated from each other by the non-conductive parts 5121, 5122, 5141, and 5142, is electrically connected with feeding parts 521, 522, 523, and 524 electrically connected with a wireless communication circuitry disposed on a printed circuit board 530.

The antenna may be formed on the first side surface 511 to the fourth side surface 514. The second side surface 512 may be formed for a second antenna part A2 operating at a low band, and the fourth side surface 514 may be formed for a fourth antenna part A4 operating in a mid-band and a high band. However, the disclosure is not limited thereto. The first side surface 511 may be formed for a first antenna part A1, and the third side surface 513 may be formed for a third antenna part A3.

The EM sensing circuitry 200 may be electrically connected with the conductive member used as any one of the first, second, third, and fourth antenna parts A1, A2, A3, and A4. The EM sensing circuitry 200 may be electrically connected with the fourth side surface 514 most advantageous for contacting or approaching an external electronic device without being affected by the grip of a user. The EM sensing circuitry 200 is connected with the feeding part 524 through a conductive line 5241 to be electrically connected with the fourth side surface 514. The fourth side surface 514 may be used for both a communication antenna radiator and an EMI detection antenna radiator. In this case, the EM sensing circuitry 200 may detect the EM signal from the external electronic device 101 using the fourth side surface 514, and may provide information associated with the detected signal to the processor 120 of the electronic device 101.

Figure 6:
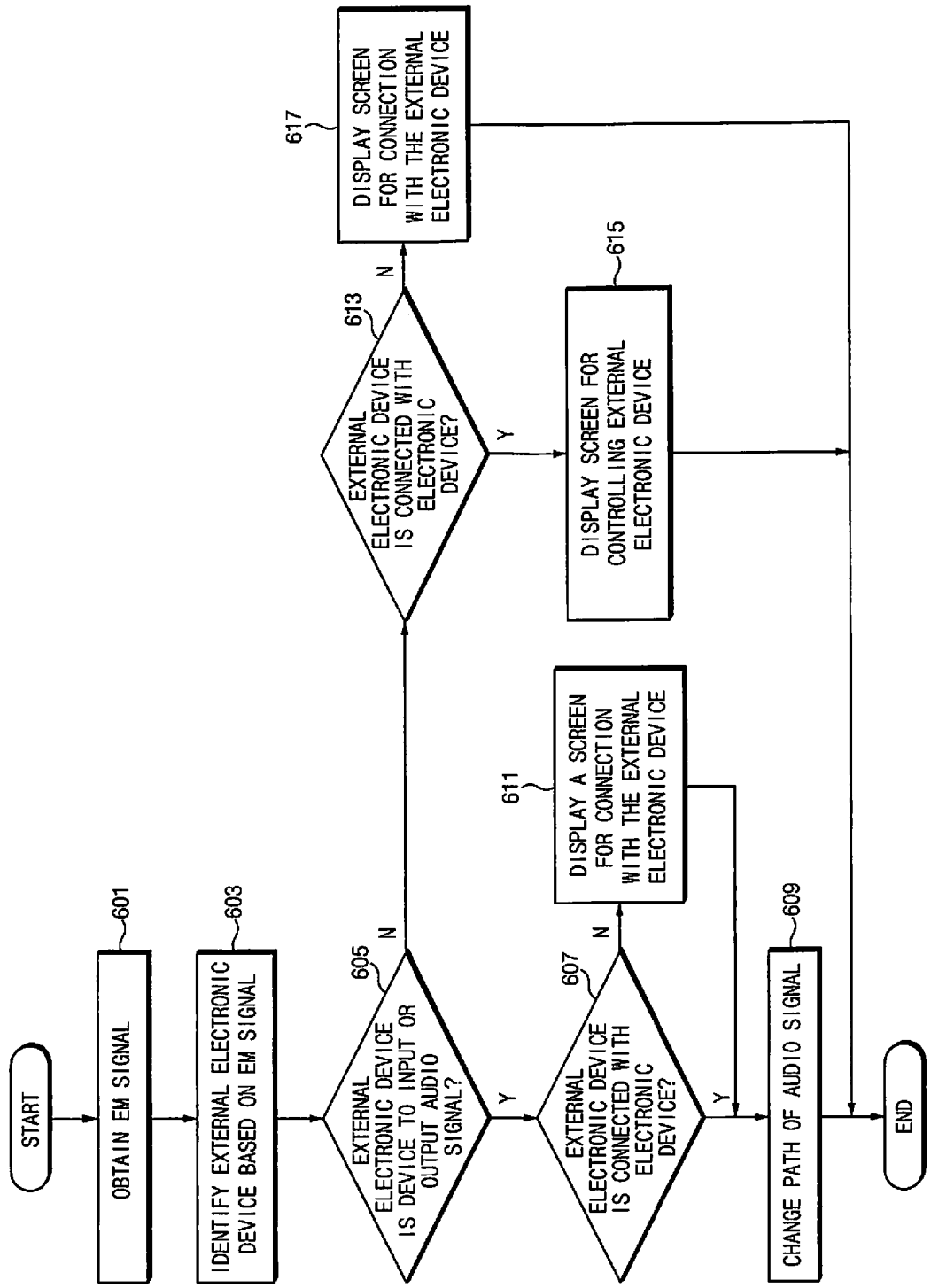
FIG. 6 is a flowchart illustrating an operation of an electronic device based on EM signal sensing, according to an embodiment.

FIG. 6 is a flowchart illustrating an operation of an electronic device based on EM signal sensing, according to an embodiment. More particularly, the operation of FIG. 6 will be described below as being performed by the electronic device 101 of FIG. 1. For example, the operation described as being performed by the electronic device 101 may be implemented with instructions (commands) that are able to be performed (or executed) by the processor 120 of the electronic device 101. The instructions may be stored in a computer-readable medium or the memory 130 of the electronic device 101 illustrated in FIG. 1.

Referring to FIG. 6, before operation 601, the processor 120 of the electronic device 101 may activate an EM function, e.g., when a specific application (e.g., a phone, music, a video, or a gallery application) is executed. Alternatively, the processor 120 may activate the EM sensing circuitry 200 when the display 160 is turned on, when the electronic device 101 is positioned in a preset specific range, when a preset time comes, or when the processor 120 is connected with a preset external device.

The processor 120 may activate the EM sensing circuitry 200, when the preset application is executed. For example, the processor 120 may activate the EM sensing circuitry 200, when an application associated with the EM sensing operation is executed.

In step 601, the processor 120 obtains an EM signal from an external electronic device through the EM sensing circuitry 200.

In step 603, the processor 120 identifies the external electronic device corresponding to the obtained EM signal, based on a reference EM profile.

The processor 120 may identify the external electronic device 201 based on the reference EM profile stored in the memory 130. The processor 120 may transmit the obtained EM signal to the EM server 205 through the wireless communication circuitry 190, and may receive information on the external electronic device 201 from the EM server 205. The processor 120 may identify the external electronic device 201 based on the received information on the external electronic device 201.

The processor 120 may identify the external electronic device 201 by obtaining an ID of the external electronic device 201. For example, the processor 120 may obtain the type of the external electronic device 201, the model name of the external electronic device 201, the release year of the external electronic device 201, the communication scheme of the external electronic device 201, the operating state of the external electronic device 201, or the information on the manufacturer of the external electronic device 201.

In step 605, the processor 120 determines whether the identified external electronic device 201 is to input or output the audio signal.

The processor 120 may determine whether the identified external electronic device to 201 is to input or output the audio signal, by using the database stored in the memory 130 and the obtained ID.

The processor 120 may transmit the obtained ID to the external server (e.g., the cloud server 206) through the communication circuitry 190, and may receive information on whether the identified external electronic device 201 is to device to input or output the audio signal, from the external server.

In step 607, when the identified external electronic device 201 is the device to input or output the audio signal, the processor 120 determines whether the identified external electronic device 201 is connected with the electronic device 101 through wireless communication.

For example, the processor 120 may determine whether the external electronic device 201 is connected with the electronic device 101 through a short range communication scheme (e.g., Bluetooth low energy (BLE), a neighbor awareness network (NAN), or WiFi).

The processor 120 may determine the electronic device 101 as being connected with the external electronic device 201 even when the electronic device 101 is operatively connected with the external electronic device 201. For example, when the user account of the electronic device 101 is associated with the user account of the external electronic device 201 (e.g., when a user of the electronic device 101 and a user of the external electronic device 201 belong to the same account or group account), the processor 120 may determine the external electronic device 201 as being connected with the electronic device 101 through the wireless communication. In other words, when the electronic device 101 and the identified external electronic device 201 are associated with the user account registered in the external server (e.g., a cloud server), the processor 120 may determine the external electronic device 201 as being connected with the electronic device 101 through wireless communication.

In step 609, when the identified external electronic device 201 is to input or output the audio signal, and when the external electronic device 201 is connected with the electronic device 101 through wireless communication, the processor 120 changes the path of an audio signal output by the electronic device 101.

For example, the processor 120 may change the path of the audio signal such that the audio signal output through the speaker of the electronic device 101 is output through the identified external electronic device 201.

As another example, the processor 120 may change the path of the audio signal such that the audio signal output through the identified external electronic device 201 is output through the speaker of the electronic device 101. That is, when the electronic device 101 obtains the EM signal from the external electronic device 201 and identifies the external electronic device 201, while the audio signal output by the electronic device 101 is being output through the external electronic device 201 (e.g., a Bluetooth speaker), the processor 120 may change the path of the audio signal such that the audio signal is output through the speaker of the electronic device 101.

The processor 120 may change the path of the audio signal when the electronic device 101 reproduces music. When the electronic device 101 does not reproduce the music, the processor 120 may not change the path of the audio signal.

When the electronic device 101 sequentially obtains EM signals of the first external electronic device, the second external electronic device, and the third external electronic device, the processor 120 may change the path of the audio signal such that the audio signal output by the electronic device 101 is sequentially output through the first external electronic device, the second external electronic device, and the third external electronic device. When the user allows the electronic device 101 to sequentially approach the first speaker, the second speaker, and the third speaker, the audio signal output by the electronic device 101 may be output through the second speaker in the middle of being output through the first speaker, and the audio signal output through the second speaker may be output through the third speaker. When the electronic device 101 obtains the EM signal from the speaker that is outputting the audio signal, the processor 120 may change the path of the audio signal such that the audio signal is output through the speaker of the electronic device 101.

When the electronic device 101 obtains the EM signal from the external electronic device, the processor 120 may add the output path of the audio signal output by the electronic device 101. For example, when the electronic device 101 obtains an EM signal from the first external electronic device while is outputting the audio signal, the electronic device 101 may add the output path of the audio signal such that the audio signal is output through the electronic device 101 and the first external electronic device. When the electronic device 101 obtains an EM signal from the second external electronic device while the audio signal is being output through the electronic device 101 and the first external electronic device, the electronic device 101 may add the output path of the audio signal such that the audio signal is output through the electronic device 101, the first external electronic device, and the second external electronic device. The electronic device 101 may add the specific number of external electronic devices as output paths of the audio signal.

The electronic device 101 may add the specific number of audio signal output paths. For example, the electronic device 101 may be configured to use two audio signal output paths. When the electronic device 101 obtains an EM signal from another external electronic device (e.g., the second external electronic device) while an audio signal is being output through the electronic device 101 and the external electronic device (e.g., the first external electronic device), the electronic device 101 may change a portion of the output path of the audio signal such that the audio signal is output through the electronic device 101 and the another external electronic device.

As another example, when the electronic device 101 obtains an EM signal from another external electronic device while an audio signal is being output through the electronic device 101 and the external electronic device, the electronic device 101 may change a portion of an output path of the audio signal such that the audio signal is output using the external electronic device and the another external electronic device. The electronic device 101 may maintain an audio signal output path of a specific device (e.g., the electronic device 101) and may change a remaining audio signal output path based on EM sensing. The electronic device 101 may change, based on EM sensing, an audio signal output path of the oldest external electronic device of at least one audio signal output path to an audio signal output path of an external electronic device which is most recently sensed.

Figure 7A:
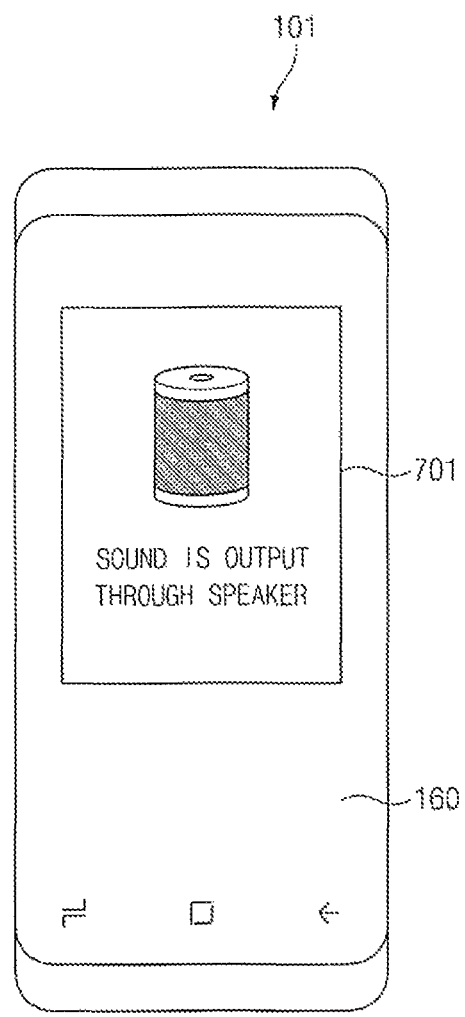
FIG. 7A illustrates a screen displayed after a path of an audio signal is changed to output an audio signal to an EM-sensed, external electronic device, according to an embodiment.

FIG. 7A illustrates a screen displayed after a path of an audio signal is changed such that an audio signal is output to an EM-sensed external electronic device, according to an embodiment.

Referring to FIG. 7A, when the path of the audio signal is changed such that the audio signal is output through an external electronic device that is identified, the processor 120 may display a message 701 that the audio signal is output through the external electronic device on the touchscreen display 160.

Figure 7B:
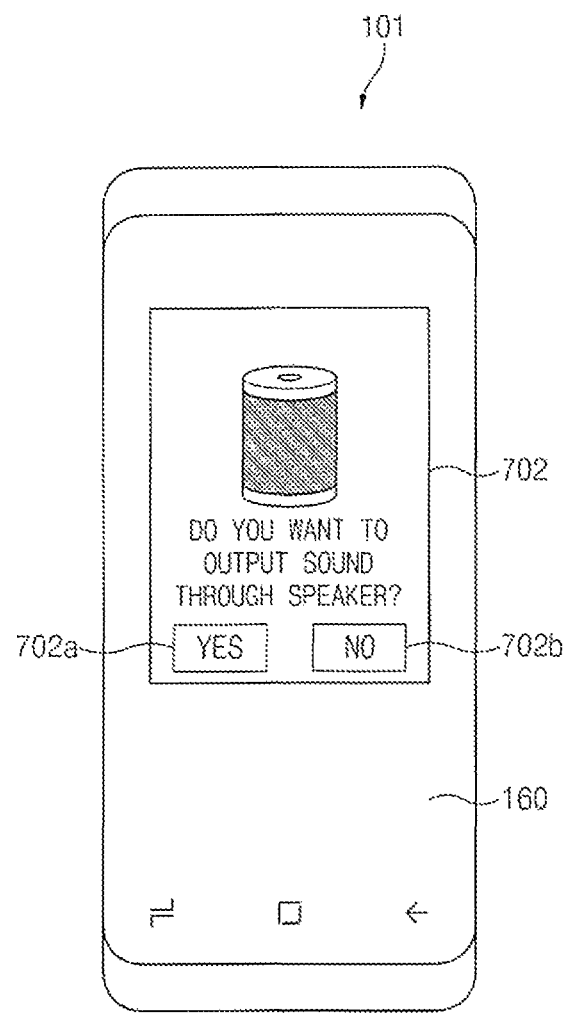
FIG. 7B illustrates a screen displayed to determine whether to change a path of an audio signal, according to an embodiment.

FIG. 7B illustrates a screen displayed to determine whether to change a path of an audio signal, according to an embodiment.

Referring to FIG. 7B, the processor 120 may display, on the touchscreen display 160, a message 702 asking whether to change the path of the audio signal before the path of the audio signal is changed. The processor 120 may determine whether to change the path of the audio signal depending on the user input (an input selecting an object 702*a* "YES" or an input selecting an object 702*b* of "NO") through the touchscreen display 160. When the object 702*a* of "YES" is selected, the processor 120 may change the path of the audio signal. When the object 702*b* of "NO" is selected, the processor 120 does not change the path of the audio signal.

The message 702 may include information on a device (e.g., a speaker) corresponding to the change in the path of the audio signal. For example as illustrated in FIG. 7B, the message 702 may include a typical name (e.g., a speaker) of the corresponding device. However, the message 702 in FIG. 7B is provide for the illustrative purpose, and the embodiments of the disclosure is not limited thereto. Accordingly, the message 702 may further include additional information (e.g., the model name, the image of the corresponding model, the model number, and/or an image specified by a user) on the device corresponding to the change in the path of the audio signal.

Figure 7C:
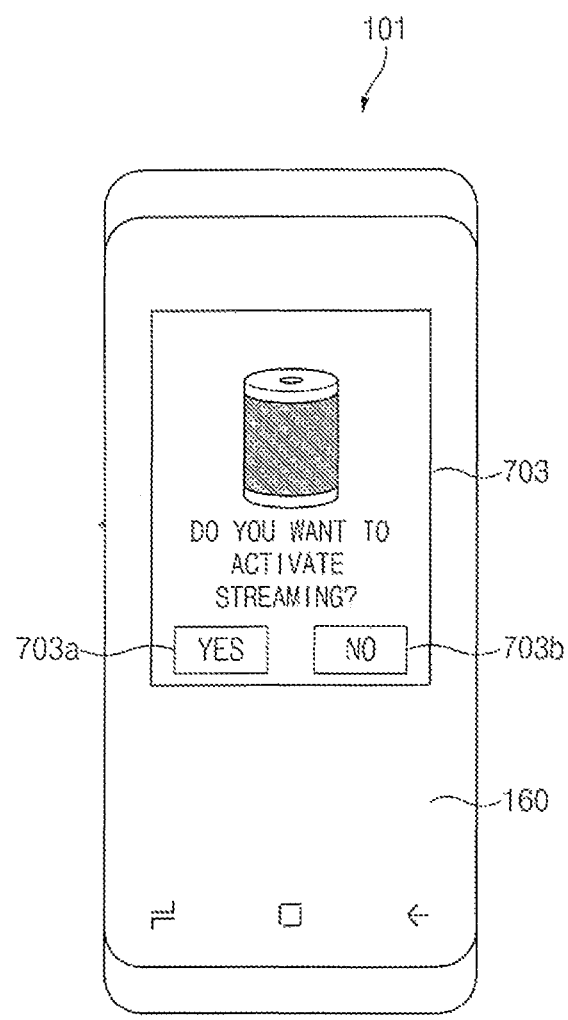
FIG. 7C illustrates a screen displayed to activate streaming of an external electronic device, according to an embodiment.

FIG. 7C illustrates a screen displayed to activate streaming of an external electronic device, according to an embodiment.

Referring to FIG. 7C, the processor 120 may display, on the touchscreen display 160, a screen 703 for activating an audio streaming function of the external electronic device. The processor 120 may receive an input for selecting an object 703*a* for activating an audio streaming function through the touchscreen display 160 or an input for selecting an object 703*b* for preventing the streaming function from being activated. The processor 120 may transmit, to the external electronic device, a request for activating the audio streaming function of the external electronic device in response to the received input.

The external electronic device may be in a state in which the audio streaming function is deactivated, even if the external electronic device is to input or output the audio signal. When the audio streaming function of the identified external electronic device is deactivated, the processor 120 may display, on the touchscreen display 160, a screen for activating the audio streaming function of the external electronic device. The processor 120 may receive an input (e.g., an object 703*a*) for activating the audio streaming function through the touchscreen display 160. The processor 120 may transmit, to the external electronic device, a request for activating the audio streaming function of the external electronic device in response to the received input. When the audio streaming function of the external electronic device is activated, the processor 120 may change the path of the audio signal such that the audio signal output by the electronic device 101 is output through the external electronic device.

When the identified external electronic device is connected with the electronic device 101 through the external server, when the external electronic device outputs an audio signal from another external electronic device, and when the another external electronic device is connected with the electronic device 101 through the external server, the processor 120 may transmit a request for terminating a connection between the external electronic device and the another external electronic device, to the another external electronic device, through a server.

The processor 120 may transmit a request for terminating the connection between an external electronic device and another external electronic device through a server. When the connection between the external electronic device and the another external electronic device is terminated, the processor 120 may change the path of the audio signal such that the audio signal output by the electronic device is output through the external electronic device.

The processor 120 may change the path of the audio signal at a preset time point. For example, when an external electronic device is identified through EM sensing while music is being reproduced through a speaker of the electronic device 101, the processor 120 may change the path of the audio signal after stopping the music which is being reproduced. As another example, the processor 120 may determine whether the electronic device 101 does not output the audio signal when the external electronic device is identified, and may change the path of the audio signal based on the determination result.

The processor 120 may change the path of the audio signal such that only the external electronic device outputs the audio signal when a specific time is elapsed after both the electronic device 101 and the identified external electronic device operate to output the audio signal. For example, when the external electronic device is identified while the audio signal is being output through the speaker of the electronic device 101, the audio signal output only through the speaker of the electronic device 101 is output through the speaker of the electronic device 101 and the external electronic device for a specific time and then output only through the external electronic device.

As another example, the processor 120 may change the path of the audio signal such that only a preset audio signal is output through the external electronic device. For example, the processor 120 may change the path of the audio signal such that all or some of a media sound, a ringing sound, a notification sound, and a system sound is output through the external electronic device.

When the output of the audio signal is terminated after the path of the audio signal is changed such that the audio signal is output through the external electronic device, the processor 120 may change the path of the audio signal such that the audio signal is output through the speaker of the electronic device 101 again. When a speaker is tagged while the electronic device 101 is reproducing music, the processor 120 may change the path of the audio signal such that the music is reproduced through the speaker. After the reproduction of the music is terminated or the music application is terminated, the processor 120 may change the path of the audio signal such that the audio signal is output through the speaker of the electronic device 101.

The electronic device 101 may perform an operation varied depending on whether the electronic device 101 performs an operation associated with the output of the audio signal. For example, when the electronic device 101 is tagged on a TV and when the processor 120 performs an operation associated with outputting the audio signal, the processor 120 may change the path of the audio signal such that the audio signal is output through the TV. When the electronic device 101 is tagged on the TV and when the TV does not perform an operation associated with outputting the audio signal, the processor 120 may display, on the touchscreen display 160, a screen for controlling the TV channel.

Referring again to FIG. 6, in step 611, the processor 120 displays a screen for communication connection with the external electronic device, when the identified external electronic device is to input or output an audio signal, but is not connected with the electronic device 101 through wireless communication. When the identified external electronic device is to input or output the audio signal, but is not connected with the electronic device 101 through the wireless communication, the processor 120 may automatically perform the communication connection with the external electronic device (e.g., without the input of the user). In this case, step 611 may be omitted. As another example, instead of step 611, the processor 120 may display a screen for indicating that the communication connection with the external electronic device is being performed or a screen for indicating that the communication connection with the external electronic device is completed.

The processor 120 may display a screen for communication connection with the external electronic device through a communication scheme supported by the external electronic device. The processor 120 may identify the external electronic device using the EM signal and may identify the communication scheme supported by the identified external electronic device. For example, when the identified external electronic device supports Bluetooth, the processor 120 may display, on the touchscreen display 160, a screen for communication connection with the external electronic device through Bluetooth. The processor 120 may establish a Bluetooth communication connection with the external electronic device based on an input to the displayed screen.

The external electronic device may output an advertising signal. For example, when power is supplied, the external electronic device may output the advertising signal based on at least one of a specific time period or a user input. The advertising signal may transmit information associated with the connection with a surrounding electronic device 101, which is not specified, or information associated with an account (e.g., pairing) with the surrounding electronic device 101 through wireless communication (e.g., BLE communication). The external electronic device may output an advertising signal through a multicast scheme or a broadcast scheme to the surroundings of the external electronic device.

The advertising signal may be based on identification information of the external electronic device, user account information, information on a pairing state with another device, a list of previously paired devices, information on devices that are able to be paired simultaneously, or a residual battery level.

The processor 120 may receive an advertising signal from one or more surrounding external electronic devices through the wireless communication circuitry 190. The processor 120 may display a user interface including objects corresponding to surrounding external electronic devices, which are the same type as that of the identified external electronic device of one or more surrounding external electronic devices that have transmitted the advertising signal. The processor 120 may receive an input for selecting one of the displayed objects, and may be connected with a surrounding external electronic device corresponding to the selected object through the wireless communication circuitry 190.

The processor 120 may determine whether the identified external electronic device is connected based on a specific protocol (e.g., a Bluetooth protocol), when the identified external electronic device is to input or output the audio signal in operation 605.

Figure 11:
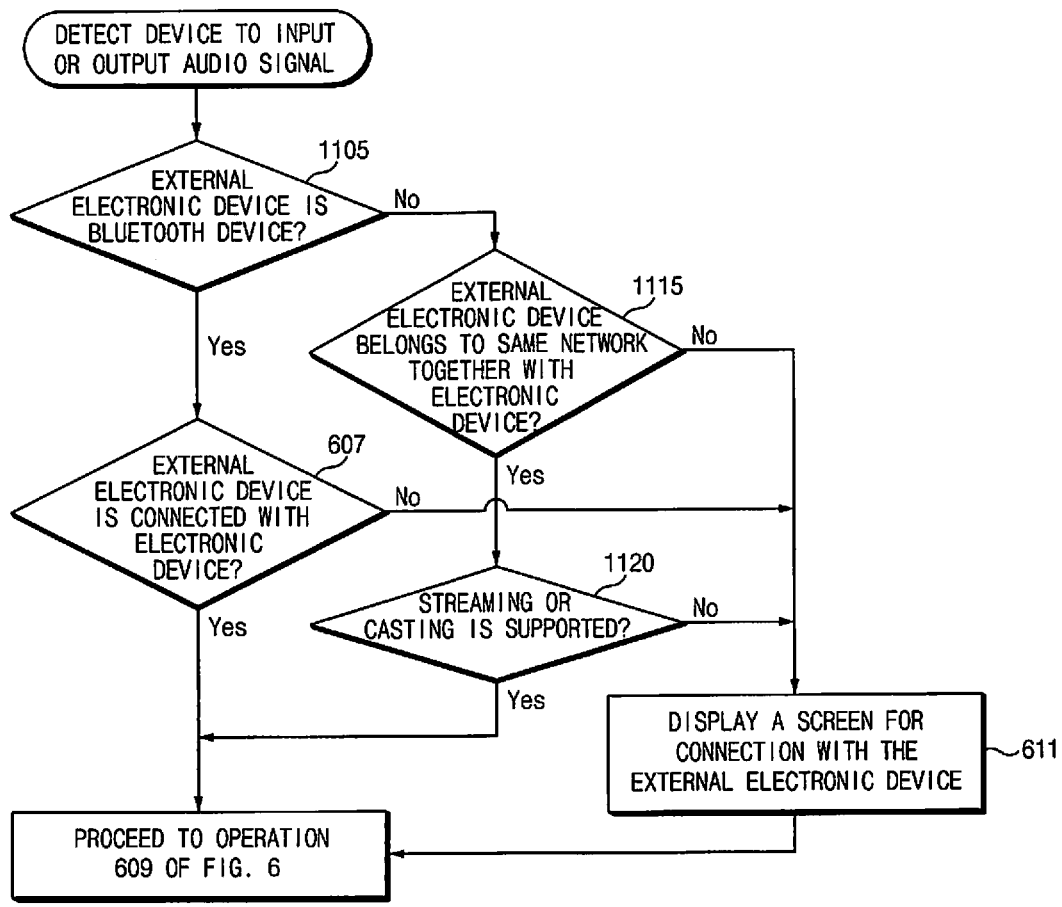
FIG. 11 is a flowchart illustrating a method for determining a connection state of an external electronic device, according to an embodiment.

FIG. 11 is a flowchart illustrating a method for determining a connection state of an external electronic device, according to an embodiment. More particularly, FIG. 11 describes steps 607 to 609 of FIG. 6 in more detail.

Referring to FIG. 11, after detecting that an external electronic device is to input or output the audio signal, the processor 120 determines whether the identified external electronic device is a Bluetooth device in step 1105. For example, when an advertising signal is received from the external electronic device, the processor 120 may determine the external electronic device as being a Bluetooth device.

When the identified external electronic device is a Bluetooth device, the processor 120 determines whether the external electronic device is connected with the electronic device in step 607. For example, the processor 120 may determine whether the external electronic device is connected with the electronic device based on a Bluetooth communication standard. When the external electronic device is connected with the electronic device, the processor 120 changes the path of the audio signal to the external electronic device in step 609 of FIG. 6.

However, when the external electronic device is not connected with the electronic device, the processor 120 displays a screen for connection with the external electronic device in step 611 of FIG. 6. As another example, the processor 120 may perform the connection (e.g., the connection based on the Bluetooth protocol) with the external electronic device.

When the identified external electronic device is not the Bluetooth device, the processor 120 determines whether the identified external electronic device belongs to the same network as the electronic device in step 1115. For example, the processor 120 may determine whether the identified external electronic device belongs to the same short-range wireless network (e.g., a network of devices connected to the same access point) as the electronic device. When the identified external electronic device belongs to the same network as the electronic device, the processor 120 determines whether the external electronic device supports streaming or casting in step 1120. For example, the external electronic device may have an application to support streaming or casting. The processor 120 may receive a signal indicating that the external electronic device supports streaming or casting, from the external electronic device or an external server associated with the external electronic device. When the external electronic device supports streaming or casting, the processor 120 changes the path of the audio signal to the external electronic device in step 609 of FIG. 6. The processor 120 may change the path of the audio signal by streaming or casting audio data, which is being reproduced in the electronic device, to the external electronic device.

When the external electronic device does not belong to the same network as the electronic device in step 1115 or when the external electronic device does not support streaming or casting in step 1120, the processor 120 displays the screen for the connection with the external electronic device in step 611 of FIG. 6. The processor 120 may display the screen for connection with the external electronic device, e.g., a screen including guide information for connection with the external electronic device, based on a communication standard (e.g., a communication standard supported by the external electronic device) other than Bluetooth.

Alternatively, when the external electronic device does not belong to the same network as the electronic device in 1115, or when the external electronic device does not support streaming or casting in step 1120, the processor 120 may terminate a procedure without changing the path of the audio signal.

Referring again to FIG. 6, in step 605, the processor 120 may sense a plurality of external electronic devices of the same type based on the EM sensing. For example, the processor 120 may sense a plurality of external electronic devices that input/output the audio signal. When one of the plurality of external electronic devices is connected with the electronic device in step 607, the processor 120 changes the path of the audio signal in step 609. However, when any one of the plurality of external electronic devices to input/output the audio signal is not connected with the electronic device 101, the processor 120 may perform an operation for connection with one of the plurality of external electronic devices, as will be described below in more detail with reference to FIGS. 8A to 8C.

Figure 8A:
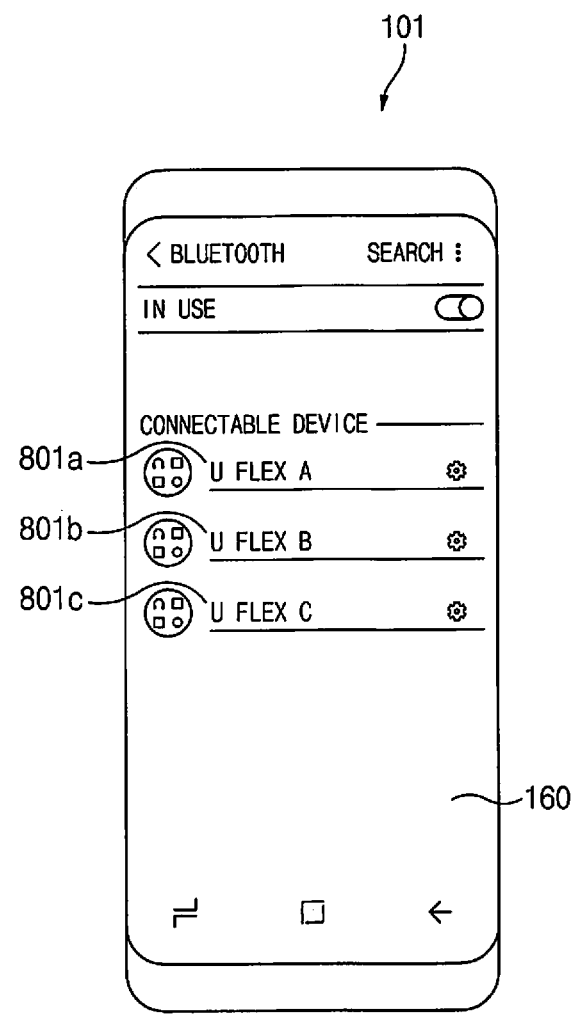
FIG. 8A illustrates a screen including objects corresponding to surrounding external electronic devices of a same type as that of an EM-sensed external electronic device, according to an embodiment.

FIG. 8A illustrates a screen including an object corresponding to surrounding external electronic devices of a same type as that of an EM-sensed external electronic device, according to an embodiment.

Referring to FIG. 8A, two Bluetooth speakers and three Bluetooth headsets ("U FLEX A", "U FLEX B", and "U FLEX C") may output advertising signals. The processor 120 may obtain an EM signal from the Bluetooth headset of "U FLEX", and may determine the external electronic device as being in a Bluetooth headset type, based on the EM signal. The external electronic device (e.g., the Bluetooth headset) may not be connected with the electronic device 101.

As illustrated in FIG. 8A, the processor 120 displays, on the touchscreen display 160, a user interface including objects 801*a*, 801*b*, and 801*c* corresponding to Bluetooth headsets of "U FLEX A", "U FLEX B", and "U FLEX C" of the same type as that of the Bluetooth headset of "U FLEX". The processor 120 may receive a user input for selecting the objects 801*a* corresponding to "U FLEX A" of the displayed objects. The processor 120 may be wireless-communication connected with the "U FLEX A" through the wireless communication circuitry 190. When the external electronic device is a Bluetooth device (e.g., in step 1105 of FIG. 11), the external electronic device is not connected to the electronic device (e.g., in step 607 of FIG. 11), and a plurality of external electronic devices that input/output audio signals of the same type are sensed, the processor 120 may provide a screen for selecting at least one of the plurality of Bluetooth electronic devices as audio outputs as illustrated in FIG. 8A. For example, when a specific condition is satisfied (e.g., a plurality of Bluetooth electronic devices of the same type are sensed), in steps 607 and 611 of FIG. 6, the processor 120 may provide the screen as in FIG. 8A. The screen for selecting one of the plurality of Bluetooth electronic devices for the audio outputs may include guide information for selecting one of the plurality of Bluetooth electronic devices. For example, the processor 120 may provide information on Received Signal Strength Indication (RSSI) from the plurality of Bluetooth electronic devices. As another example, the processor 120 may arrange the plurality of Bluetooth electronic devices based on the RSSI.

FIG. 8 illustrates a screen displayed for determining a connection state between an electronic device and a selected surrounding external electronic device, according to an embodiment.

Figure 8B:
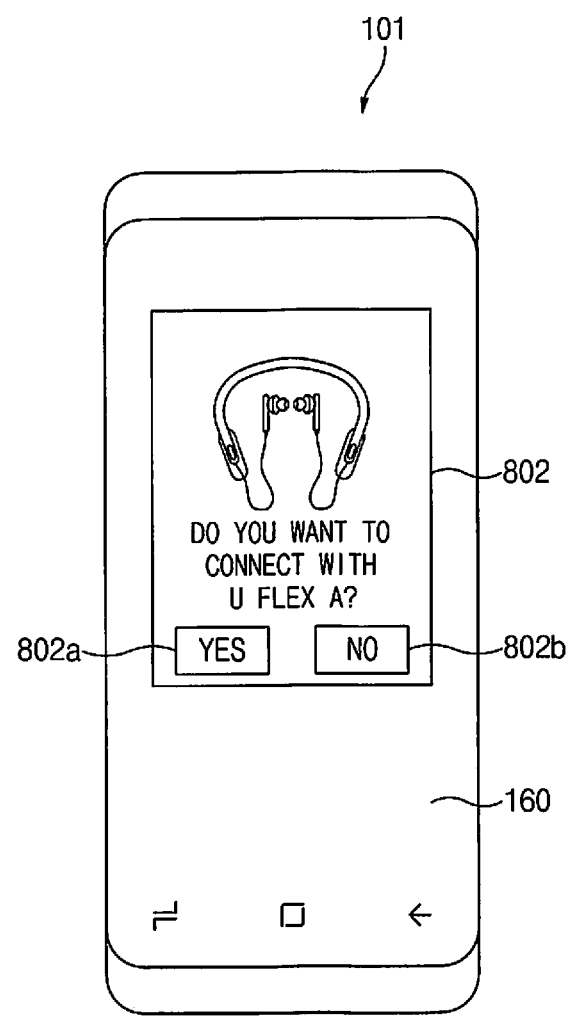
FIG. 8B illustrates a screen displayed for determining a connection state between an electronic device and a selected surrounding external electronic device, according to an embodiment.

Referring to FIG. 8B, the processor 120 displays a screen 802 for determining the connection state between the electronic device 101 and the selected surrounding external electronic device. When an object 802*a* of "YES" is selected, the processor 120 may be connected with a surrounding external electronic device (e.g., "U FLX A") based on wireless communication through the wireless communication circuitry 190. When an object 802*b* of "No" is selected, the processor 120 does not connect with the surrounding external electronic device (e.g., "U FLX A"). For example, the processor 120 may provide a screen as illustrated in FIG. 8B for connection with the external electronic device in step 611 of FIG. 6.

Figure 8C:
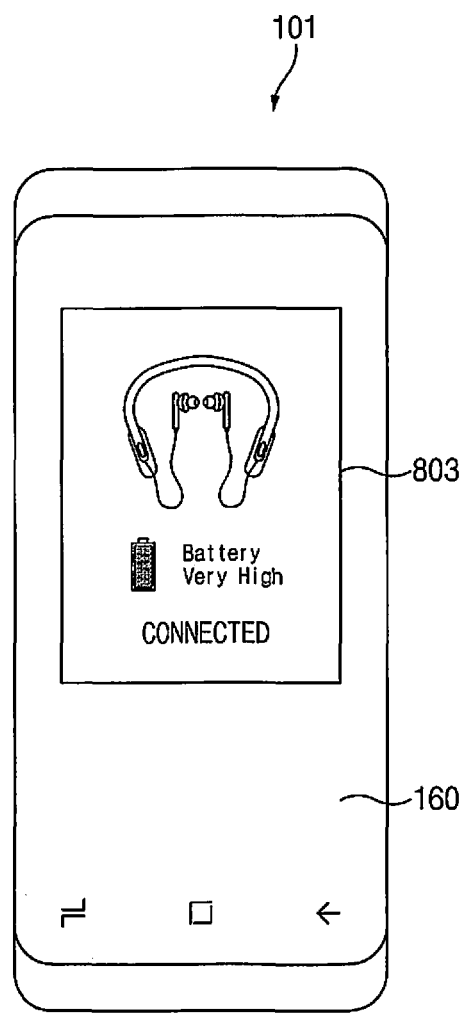
FIG. 8C illustrates a screen displayed for indicating that an external electronic device is connected with an electronic device, according to an embodiment.

FIG. 8C is a screen displayed when an external electronic device is connected to an electronic device, according to an embodiment.

Referring to FIG. 8C, when the external electronic device is connected with the electronic device 101, the processor 120 displays a connection completion screen 803. The screen example of FIG. 8C is provided for illustrative purposes, and the processor 120 may omit displaying the connection completion screen 803 after the connection is completed.

Referring again to FIG. 6, when the electronic device 101 is connected with the external electronic device through wireless communication, the processor 120 may change the path of the audio signal such that the audio signal is output through the connected external electronic device.

In step 613, the processor 120 determines whether the identified external electronic device 201 is connected with the electronic device 101 through wireless communication. Step 613 may correspond to step 607. Accordingly, the above-described embodiments, which are applicable to step 607, may also be applied to step 613.

In step 615, when the identified external electronic device is not to input or output the audio signal, but is connected with the electronic device 101 through communication, the processor 120 displays a screen for controlling the external electronic device.

Figure 9:
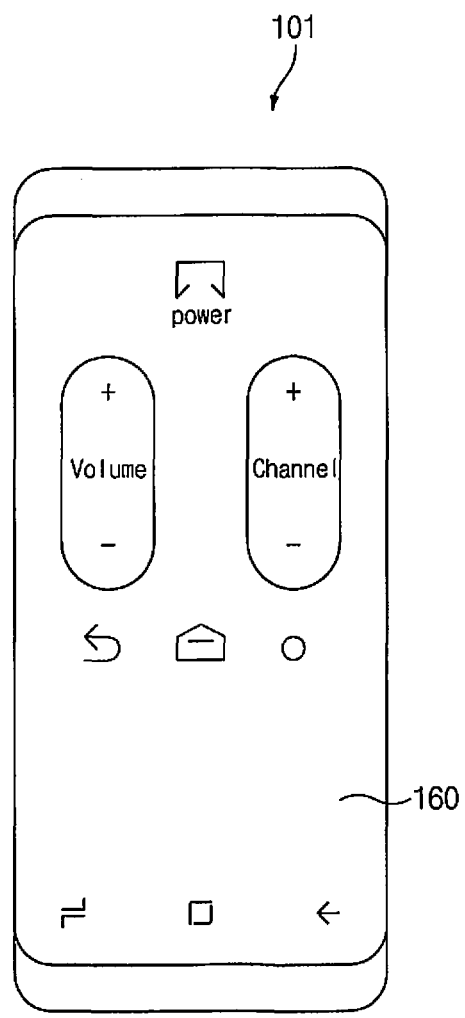
FIG. 9 illustrates a screen displayed for controlling an external electronic device, which is not a device to input or output an audio signal, according to an embodiment.

FIG. 9 illustrates a screen displayed to control an external electronic device that does not input or output an audio signal, according to an embodiment.

Referring to FIG. 9, the identified external electronic device, which does not input or output the audio signal, may be connected with the electronic device 101. For example, the identified external electronic device may be an air conditioner. The processor 120 displays, on the touchscreen display 160, a screen for controlling the external electronic device. The processor 120 may transmit, to the external electronic device, a control command for controlling the external electronic device based on a user input through the touchscreen display 160.

When the external electronic device is connected with the electronic device 101 through communication, the processor 120 may transmit a specific control command to the identified external electronic device.

For example, when the identified external electronic device is a bulb connected with the electronic device 101, the processor 120 may transmit, to the bulb, a control command for turning the bulb on or off. As another example, when the identified external electronic device is a robot cleaner connected with the electronic device 101, the processor 120 may transmit, to the robot cleaner, a control command for starting or stopping a cleaning function.

Referring again to FIG. 6, in step 617, the processor 120 displays a screen for communication connection with the external electronic device, when the identified external electronic device, which does not input or output the audio signal, is not connected with the electronic device 101 through communication.

Figure 10:
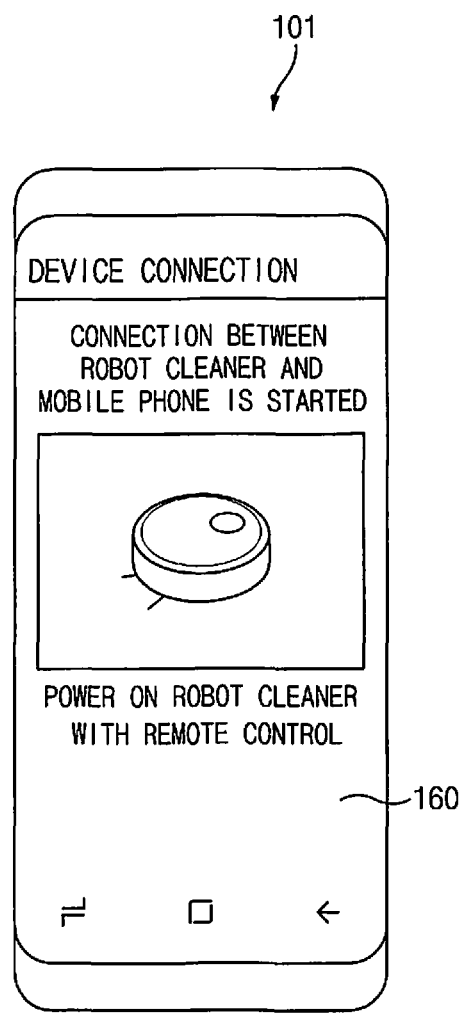
FIG. 10 illustrates a screen displayed for connecting an external electronic device, which is not a device to input or output an audio signal, with an electronic device, according to an embodiment.

FIG. 10 illustrates a screen displayed for connecting an external electronic device, which does not input or output an audio signal, with an electronic device, according to an embodiment.

Referring to FIG. 10, the identified external electronic device, e.g., a robot cleaner, which does not input or output the audio signal, may not be connected with the electronic device 101.

The processor 120 displays, on the touchscreen display 160, a screen for connecting the electronic device with the robot cleaner as illustrated in FIG. 10. As illustrated in FIG. 10, the processor 120 displays a guide message for connecting the electronic device with the robot cleaner. For example, the guide message instructs the power of the external electronic device to be turned on, for the connection with the external electronic device. When the operation based on the guide message is performed, the electronic device may be wirelessly connected with the external electronic device.

When the electronic device is connected with the external electronic device through the wireless communication, a screen for controlling the external electronic device may be displayed.

Figure 12:
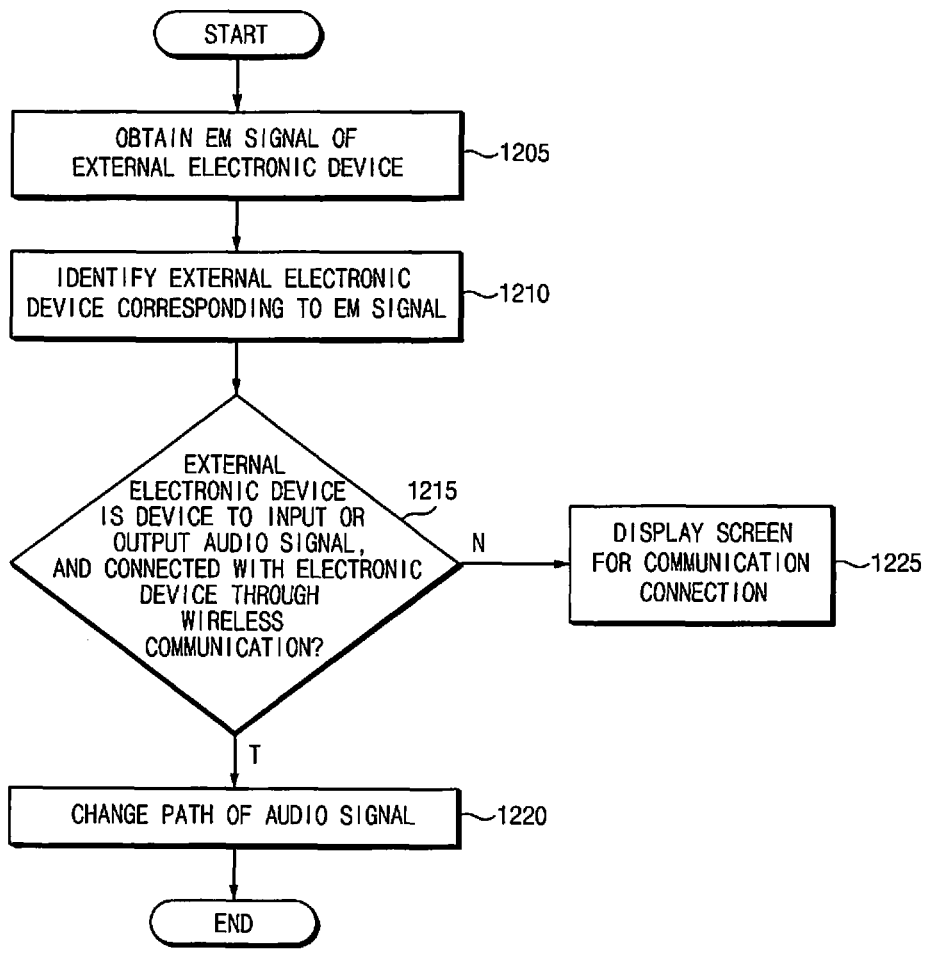
FIG. 12 is a flowchart illustrating a method for changing a path of an audio signal, according to an embodiment.

FIG. 12 is a flowchart illustrating a method for changing a path of an audio signal, according to an embodiment. As an example, the method of FIG. 12 be described below as being performed by the electronic device 101 illustrated in FIGS. 2A and 2B.

Referring to FIG. 12, in step 1205, the processor 120 of the electronic device 101 obtains an EM signal from an external electronic device. For example, the processor 120 may obtain the EM signal by using an EM sensing circuitry.

In step 1210, the processor 120 identifies the external electronic device corresponding to the EM signal, e.g., based on the reference EM profile. The processor 120 may obtain an ID of the external electronic device based on the EM signal and the reference EM profile. The processor 120 may determine whether the identified external electronic device inputs or outputs the audio signal, by using the obtained ID and a database stored in the memory. The processor 120 may transmit, to the external server, data including the ID, receive information on whether the identified external electronic device is the device for input/output the audio signal, from the external server, and may determine, by using the received information, whether the identified external electronic device inputs or outputs the audio signal.

In step 1215, the processor 120 determines whether the identified external electronic device inputs or outputs the audio signal, and is connected with the electronic device 101 through the wireless communication. When the external electronic device inputs or outputs the audio signal and is connected with the electronic device 101, in step 1220, the processor 120 changes the path of the audio signal such that at least a portion of the audio signal output to the electronic device 101 is output through the external electronic device. The processor 120 may change the path of the audio signal while the electronic device is not outputting the audio signal.

The processor 120 may display, on the touchscreen display, a screen for activating an audio streaming function of the external electronic device, e.g., as illustrated in FIG. 7C, when the audio streaming function of the connected external electronic device is deactivated. The processor 120 may transmit, to the external electronic device, a request for activating the audio streaming function of the external electronic device when receiving an input for activating the audio streaming function through the touchscreen display.

When the identified external electronic device is connected through an external server, when the external electronic device outputs an audio signal from another external electronic device, and when the another external electronic device is connected with the electronic device through the external server, the processor 120 may transmit a request for terminating connection between the external electronic device and the another external electronic device, to the another external electronic device through the external server. When the connection between the external electronic device and the another external electronic device is terminated, the processor 120 may change the path of the audio signal such that the audio signal output by the electronic device is output through the external electronic device, The processor 120 may display, on the touchscreen display a message asking a user whether the path of the audio signal should be changed, e.g., as illustrated in FIG. 7B, before changing the path of the audio signal. The processor 120 may change the path to of the audio signal in response to a user input through the touchscreen display.

In step 1225, when the external electronic device does not input or output the audio signal or is not connected through wireless communication, the processor 120 displays a screen for establishing communication connection, e.g., as illustrated in FIG. 8B.

The memory 130 may store data associated with a communication scheme supported by the external electronic device. For example, when the identified external device inputs or outputs the audio signal but is not connected with the electronic device, the processor 120 may display, on the touchscreen display, a screen for establishing a communication connection with the external electronic device using the communication scheme supported by the external electronic device.

When the identified external electronic device inputs or outputs the audio signal but is not connected with the electronic device, the electronic device may receive an advertising signal from surrounding external electronic devices through the wireless communication circuitry, and display, on the touchscreen display, objects corresponding to surrounding external electronic devices, e.g., as illustrated in FIG. 9A, which the same type as the identified external electronic device, of the surrounding external electronic devices which have transmitted the advertising signal. The processor 120 may receive an input from a user for selecting one of the displayed objects, and connect with a surrounding external electronic device corresponding to the selected object through the wireless communication circuitry.

When the identified external electronic device does not input or output the audio signal but is connected with the electronic device through communication, the processor 120 may display, on the touchscreen display, a screen for controlling the external electronic device.

When the identified external electronic device does not input or output the audio signal and is not connected with the electronic device through communication, the processor 120 may display, on the touchscreen display, a screen for communication connection with the external electronic device.

According to an embodiment, a method is provided for changing a path of an audio signal by an electronic device, which includes obtaining an EM signal of an external electronic device through an EM sensing circuitry, identifying the external electronic device corresponding to the obtained EM signal, changing the path of the audio signal, such that the audio signal output by the electronic device is output through the external electronic device, when the identified external electronic device is a device to input or output the audio signal and is connected with the electronic device through wireless communication, and displaying, on a touchscreen display of the electronic device, a screen for communication connection with the external electronic device, when the identified external electronic device is the device to input or output the audio signal and is not connected with the electronic device through wireless communication.

The method further includes displaying, on the touchscreen display, a screen for activating an audio streaming function of the external electronic device, when the identified external electronic device is the device to input or output the audio signal, and is connected with the electronic device through the wireless communication, and when the audio streaming function of the connected external electronic device is deactivated, receiving an input for activating the audio streaming function, transmitting, to the external electronic device, a request for activating the audio streaming function of the external electronic device, and changing the path of the audio signal such that the audio signal output by the electronic device is output through the external electronic device.

When the identified external electronic device is the device to input or output the audio signal, and is connected with the electronic device through an external server, when the external electronic device outputs an audio signal from another external electronic device, and when the another external electronic device is connected with the electronic device through the external server, the method may further include transmitting a request for terminating connection between the external electronic device and the another external electronic device, to the another external electronic device through the external server, and changing the path of the audio signal such that the audio signal output by the electronic device is output through the external electronic device, when the connection between the external electronic device and the another external electronic device is terminated.

Changing the path of the audio signal may include changing the path of the audio signal while the electronic device does not output the audio signal.

Displaying the screen for communication connection with the external electronic device may include displaying, on the touchscreen display, the screen for communication connection with the external electronic device through a communication scheme supported by the external electronic device.

Displaying the screen for communication connection with the external electronic device may include receiving an advertising signal from at least one surrounding external electronic device, displaying objects corresponding to surrounding external electronic devices, which are in the same type as a type of the identified external electronic device, of the at least one surrounding external electronic device which has transmitted the advertising signal, receiving an input for selecting one of the displayed objects, and connecting with a surrounding external electronic device corresponding to the selected object through the wireless communication.

The above described operations of the processor 120 and/or the electronic device may be performed through instructions stored in a computer-readable recording medium.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a to corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment of the disclosure, an electronic device may obtain an EM signal from a nearby external electronic device and may identify the external electronic device based on the obtained EM signal. The electronic device may provide a method for changing an audio signal path based on information on the identified external electronic device.

Besides, a variety of effects directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a touchscreen display;
wireless communication circuitry;
electromagnetic signal (EM) sensing circuitry configured to sense an EM signal;
a processor operatively connected with the touchscreen display, the wireless communication circuitry, and the EM sensing circuitry; and
a memory configured to store a reference EM profile including information associated with an external electronic device and operatively connected with the processor,
wherein the memory is further configured to store instructions that, when executed, cause the processor to:
obtain an EM signal of the external electronic device through the EM sensing circuitry,
identify the external electronic device, based on the obtained EM signal and the reference EM profile,
change a path of an audio signal, which is currently output by the electronic device, to be output through the external electronic device, when the identified external electronic device is capable of inputting or outputting the audio signal and is connected with the electronic device, and
display a screen for establishing a connection with the external electronic device, when the identified external electronic device is capable of inputting or outputting the audio signal and is not connected with the electronic device.

2. The electronic device of claim 1, wherein the memory is further configured to store a database, and
wherein the instructions, when executed, further cause the processor to:
obtain an identification (ID) of the external electronic device based on the reference EM profile and the obtained EM signal, and
determine whether the identified external electronic device is capable of inputting or outputting the audio signal, by using the obtained ID and the database stored in the memory.

3. The electronic device of claim 1, wherein the instructions, when executed, further cause the processor to:
obtain an identification (ID) of the external electronic device based on the reference EM profile and the obtained EM signal,
transmit data including the ID to an external server,
receive, from the external server, information on whether the identified external electronic device is capable of inputting or outputting the audio signal, and
determine whether the identified external electronic device is capable of inputting or outputting the audio signal, based on the received information.

4. The electronic device of claim 1, wherein the instructions, when executed, further cause the processor to:
display, on the touchscreen display, a screen for activating an audio streaming function of the external electronic device, when the audio streaming function of the external electronic device is deactivated,
receive an input for activating the audio streaming function through the touchscreen display, transmit, to the external electronic device, a request for activating the audio streaming function of the external electronic device, and
change the path of the audio signal to be output through the external electronic device.

5. The electronic device of claim 1, wherein the instructions, when executed, further cause the processor to:
when the identified external electronic device is connected through an external server, the external electronic device outputs another audio signal from another external electronic device, and the another external electronic device is connected with the electronic device through the external server, transmit a request for terminating a connection between the external electronic device and the another external electronic device, to the another external electronic device, through the external server, and
change the path of the audio signal to be output through the external electronic device, when the connection between the external electronic device and the another external electronic device is terminated.

6. The electronic device of claim 1, wherein the instructions, when executed, further cause the processor to:
display, on the touchscreen display, a message of asking whether to change the path of the audio signal, before changing the path of the audio signal, and
change the path of the audio signal in response to a user input, through the touchscreen display, instructing to change the path of the audio signal.

7. The electronic device of claim 1, wherein the instructions, when executed, further cause the processor to change the path of the audio signal while the electronic device does not output the audio signal.

8. The electronic device of claim 1, wherein the memory is further configured to store data associated with a communication scheme supported by the external electronic device, and
wherein the instructions, when executed, further cause the processor to when the identified external device is capable of inputting or outputting the audio signal and is not connected with the electronic device, display, on the touchscreen display, the screen for establishing the communication connection with the external electronic device using the communication scheme supported by the external electronic device.

9. The electronic device of claim 1, wherein the instructions, when executed, further cause the processor to:
when the identified external electronic device is capable of inputting or outputting the audio signal and is not connected with the electronic device, receive an advertising signal from a surrounding external electronic device through the wireless communication circuitry,
determine whether the surrounding external electronic device is a same type of device as the identified external electronic device, and
when the surrounding external electronic device is the same type of device as the identified external electronic device, display, on the touchscreen display, an object corresponding to the surrounding external electronic device, receive an input for selecting the displayed object, and connect with the surrounding external electronic device corresponding to the selected object through the wireless communication circuitry.

10. The electronic device of claim 1, wherein the instructions, when executed, further cause the processor to, when the identified external electronic device is not capable of inputting or outputting the audio signal and is connected with the electronic device through communication, display, on the touchscreen display, a screen for controlling the external electronic device.

11. The electronic device of claim 1, wherein the instructions, when executed, further cause the processor to, when the identified external electronic device is not capable of inputting or outputting the audio signal and is not connected with the electronic device, display, on the touchscreen display, the screen for establishing the communication connection with the external electronic device.

12. A method for changing a path of an audio signal by an electronic device, the method comprising:
obtaining an electromagnetic signal (EM) signal of an external electronic device through EM sensing circuitry;
identifying the external electronic device based on the obtained EM signal;
changing the path of the audio signal that is output by the electronic device to be output through the external electronic device, when the identified external electronic device is capable of inputting or outputting the audio signal and is connected with the electronic device; and
displaying, on a touchscreen display of the electronic device, a screen for establishing a communication connection with the external electronic device, when the identified external electronic device is capable of inputting or outputting the audio signal and is not connected with the electronic device.

13. The method of claim 12, further comprising:
displaying, on the touchscreen display, a screen for activating an audio streaming function of the external electronic device, when the identified external electronic device is capable of inputting or outputting the audio signal, and is connected with the electronic device, and when the audio streaming function of the external electronic device is deactivated;
receiving an input for activating the audio streaming function; and
transmitting, to the external electronic device, a request for activating the audio streaming function of the external electronic device.

14. The method of claim 12, further comprising,
when the identified external electronic device is capable of inputting or outputting the audio signal, and is connected with the electronic device through an external server; the external electronic device outputs another audio signal from another external electronic device, and the another external electronic device is connected with the electronic device through the external server, transmitting a request for terminating a connection between the external electronic device and the another external electronic device, to the another external electronic device, through the external server,
wherein changing the path of the audio signal is performed, after the connection between the external electronic device and the another external electronic device is terminated, in response to the request.

15. The method of claim 12, wherein changing the path of the audio signal comprises changing the path of the audio signal while the electronic device does not output the audio signal.

16. The method of claim 12, wherein displaying the screen for establishing the communication connection with the external electronic device comprises displaying, on the touchscreen display, the screen for establishing the communication connection with the external electronic device through a communication scheme supported by the external electronic device.

17. The method of claim 12, wherein displaying the screen for establishing the communication connection with the external electronic device comprises:
receiving an advertising signal from a surrounding external electronic device;
determining whether the surrounding external electronic device is a same type of device as the identified external electronic device; and
when the surrounding external electronic device is the same type of device as the identified external electronic device, displaying an object corresponding to the surrounding external electronic device; receiving an input for selecting the displayed object, and connecting with the surrounding external electronic device corresponding to the selected object.

18. A non-transitory computer-readable recording medium that stores instructions, which when executed by a processor of an electronic device, cause the electronic device to:
obtain an electromagnetic signal (EM) signal of an external electronic device through EM sensing circuitry;
identify the external electronic device corresponding to the obtained EM signal;
change a path of an audio signal that is output by the electronic device to be output through the external electronic device, when the identified external electronic device is capable of inputting or outputting the audio signal and is connected with the electronic device; and
display, on a touchscreen display of the electronic device, a screen for establishing a communication connection with the external electronic device, when the identified external electronic device is capable of inputting or outputting the audio signal and is not connected with the electronic device.

19. The non-transitory computer-readable recording medium of claim 18, wherein the instructions, when executed, further cause the electronic device to:
display, on the touchscreen display, a screen for activating an audio streaming function of the external electronic device, when the identified external electronic device is capable of inputting or outputting the audio signal, and is connected with the electronic device, and when the audio streaming function of the connected external electronic device is deactivated;
receive an input for activating the audio streaming function;
transmit, to the external electronic device, a request for activating the audio streaming function of the external electronic device; and
change the path of the audio signal to be output through the external electronic device.

20. The non-transitory computer-readable recording medium of claim 18, wherein the instructions, when executed, further cause the electronic device to:
when the identified external electronic device is capable of inputting or outputting the audio signal and is connected with the electronic device through an external server; the external electronic device outputs another audio signal from another external electronic device, and the another external electronic device is connected with the electronic device through the external server, transmit a request for terminating a connection between the external electronic device and the another external electronic device, to the another external electronic device, through the external server; and
change the path of the audio signal to be output through the external electronic device, when the connection between the external electronic device and the another external electronic device is terminated.

21. An electronic device, comprising:
a touchscreen;
a transceiver;
a sensor; and
a processor operatively connected with the touchscreen, the transceiver, and the sensor, the processor configured to:
obtain, via the sensor, a signal of an external electronic device,
change a path of an audio signal, which is currently output by the electronic device, to be output through the external electronic device, when the external electronic device is connected with the electronic device and is determined to be capable of inputting or outputting the audio signal,
when the identified external electronic device is capable of inputting or outputting the audio signal and is not connected with the electronic device, receive, via the transceiver, an advertising signal from a surrounding external electronic device; and
when the surrounding external electronic device the same type as the identified external electronic device, display, on the touchscreen, an object corresponding to the surrounding external electronic device.

* * * * *